United States Patent [19]

D'Agosto, III et al.

[11] Patent Number: 4,860,339

[45] Date of Patent: Aug. 22, 1989

[54] PROGRAMMABLE TELEPHONE/DICTATION TERMINAL AND METHOD OF OPERATING SAME

[75] Inventors: Nicholas A. D'Agosto, III, Trumbull; David B. Chamberlin, Milford; Jy-Hong Su, Norwalk; Emil F. Jachmann, Greenwich; Suzanne N. Grey, Springdale, all of Conn.

[73] Assignee: Dictaphone Corporation, Stratford, Conn.

[21] Appl. No.: 895,017

[22] Filed: Aug. 8, 1986

[51] Int. Cl.⁴ .................. H04M 1/21; H04M 1/272; H04M 1/64; H04M 11/10

[52] U.S. Cl. .................................. 379/67; 369/29; 379/75; 379/110; 379/355

[58] Field of Search .................. 379/67, 75, 79, 84, 379/214, 213, 157, 165, 200, 216, 354, 355, 110, 267, 442; 369/25, 29

[56] References Cited

U.S. PATENT DOCUMENTS

| | | | |
|---|---|---|---|
| 3,433,428 | 3/1969 | Schatteman | 192/53 H |
| 3,467,790 | 9/1969 | Bolick, Jr. | 360/71 |
| 3,635,424 | 1/1972 | Morello | 242/68.3 |
| 3,758,726 | 9/1973 | Bolick, Jr. et al. | 242/198 |
| 3,779,498 | 12/1973 | Takashino | 242/204 |
| 3,823,388 | 7/1974 | Chadima, Jr. et al. | 379/93 X |
| 3,834,651 | 9/1974 | Hashizume et al. | 242/199 |
| 3,842,433 | 10/1974 | Lemelson | 360/105 |
| 3,879,586 | 4/1975 | DuRocher et al. | 200/5 A |
| 3,885,108 | 5/1975 | Zock | 379/32 |
| 3,896,493 | 7/1975 | Ando | 360/96 |
| 3,903,369 | 9/1975 | Darwood | 379/77 |
| 3,914,551 | 10/1975 | Hunt | 379/79 |
| 3,916,121 | 10/1975 | Stuzzi | 360/13 |
| 3,920,926 | 11/1975 | Lenaerts et al. | 379/93 |
| 3,999,050 | 12/1976 | Pitroda | 364/419 |
| 4,007,491 | 2/1977 | Bolick, Jr. et al. | 360/74 |
| 4,057,839 | 11/1977 | Banks | 360/93 |
| 4,115,846 | 9/1978 | Laine | 364/200 |
| 4,186,279 | 1/1980 | Face | 379/354 |
| 4,212,438 | 7/1980 | Schatteman | 242/201 |
| 4,243,845 | 1/1981 | Feinberg | 379/355 |
| 4,263,481 | 4/1981 | Ho et al. | 379/80 |
| 4,291,198 | 9/1981 | Anderson et al. | 379/96 |
| 4,301,525 | 11/1981 | Mohammadioun et al. | 369/29 |
| 4,303,998 | 12/1981 | Plunkett, Jr. | 369/29 |
| 4,306,117 | 12/1981 | Jacobson | 379/76 |
| 4,317,143 | 2/1982 | Osanai | 360/74.1 |
| 4,319,336 | 3/1982 | Anderson et al. | 364/900 |
| 4,338,494 | 7/1982 | Theis | 379/72 |
| 4,341,929 | 7/1982 | Alexander et al. | 379/359 |
| 4,375,584 | 3/1983 | Muzumdar et al. | 379/428 |
| 4,378,917 | 4/1983 | Negishi et al. | 242/186 |
| 4,392,218 | 7/1983 | Plunkett, Jr. | 369/29 |
| 4,399,527 | 8/1983 | Titus, IV et al. | 369/28 |
| 4,422,114 | 12/1983 | Sugihara | 360/96.4 |
| 4,425,627 | 1/1984 | Eibner | 364/900 |
| 4,431,870 | 2/1984 | May et al. | 379/357 |
| 4,463,417 | 7/1984 | Bushaw et al. | 364/200 |
| 4,475,013 | 10/1984 | Lee et al. | 379/355 |
| 4,482,085 | 11/1984 | Tanaka et al. | 226/187 |
| 4,482,786 | 11/1984 | Flynn, Jr. | 379/165 |
| 4,488,274 | 12/1984 | Plunkett, Jr. | 369/24 |
| 4,503,288 | 3/1985 | Kessler | 379/67 |
| 4,524,244 | 6/1985 | Faggin et al. | 379/93 |
| 4,533,791 | 8/1985 | Read et al. | 379/96 |
| 4,570,035 | 2/1986 | Pinede et al. | 379/164 |
| 4,602,132 | 7/1986 | Nagatomi et al. | 379/159 |
| 4,605,825 | 8/1986 | Komuro et al. | 379/165 |
| 4,658,097 | 4/1987 | D'Agosto, III et al. | 379/75 |

OTHER PUBLICATIONS

Cygnet Communications CoSystem; Cygnet Technologies, Inc., brochure, undated.
The Zymacom Information Exchange; Zymacom, Inc., brochure, 1985.

Primary Examiner—Thomas W. Brown
Attorney, Agent, or Firm—Robert H. Whisker; Melvin J. Scolnick; David E. Pitchenik

[57] ABSTRACT

A programmable telephone/dictation terminal that can be disposed in any one of several different modes of operation including, but not limited to, dictating information onto a recorder, communicating over a telephone network, recording incoming messages received via a telephone line, preventing a telephone dial out operation and communicating "text" messages with a supervisory console. The terminal is provided with several programmable keys each being assignable by the terminal user with a particular function such that, upon the simple operation of that key, the assigned function is carried out. The user may change the function to which a particular programmed key is assigned, as desired.

52 Claims, 14 Drawing Sheets

PROGRAMMABLE TELEPHONE/DICTATION TERMINAL AND METHOD OF OPERATING SAME

BACKGROUND OF THE INVENTION

This invention relates to a telephone/dictation terminal and, more particularly, to such a terminal having programmable keys, any one of which may be assigned with a particular function that can be changed, as desired, by the user of the terminal, whereafter the simple actuation of a programmed key initiates the particular function that has been assigned to that key. The present invention also relates to a method of programming and operating such a terminal.

The present invention relates to and is usable in a modular dictating system of the type described generally in copending application Ser. No. 895,006, entitled "Modular Dictation/Transcription System", filed Aug. 8, 1986 and assigned to the assignee of the present invention, the disclosure of said application being incorporated herein by reference.

Dictation equipment historically has been categorized as desk-top equipment, central dictation equipment and portable equipment. In modern desk-top dictating machines, messages are recorded on a record medium, such as a magnetic tape, at one machine and subsequently are transcribed at another machine. Typically, the record medium must be removed from the dictating machine and loaded into the transcribing machine. While such a desk-top dictating machine also may be adapted to record incoming messages received over a telephone line, as in U.S. Pat. No. 4,309,571, assigned to the assignee of the present invention, typical desk-top equipment offers significantly little alternative uses.

Central dictation equipment is characterized by one or more centrally located recorders to which several remote dictate stations are connected, usually by so-called "private wire" connections. In general, a particular recorder may be operably connected to any remote dictate station. In some of these central systems, the recording medium is an endless loop of magnetic tape upon which messages from different authors may be recorded. One advantage of this endless loop system is that, concurrently with the recording of a new message, previously dictated messages may be transcribed by playback equipment connected to the central recorder. One example of such a central dictation system is described in U.S. Pat. No. 3,984,644, assigned to the assignee of the instant invention. Another type of central dictation equipment is described in U.S. Pat. No. 4,071,857, also assigned to the assignee of this invention, wherein several individual recording media, such as magnetic tape cassettes, are loaded, one-at-a-time, onto a recorder which may be accessed by any of the aforementioned remote dictate stations. After a preset amount of material has been recorded, a fresh cassette is substituted for the used one which, in turn, may be transcribed by, for example, a desk-top transcribe machine.

While desk-top and central dictation equipment have respective uses and advantages, the equipment used to record messages on one has not, heretofore, been usable to record messages on the other. Thus, to exploit the benefits offered by both types of systems, an executive must have both a desk-top dictating machine and a remote dictate station on his desk.

In addition to dictating equipment, the typical office environment naturally includes a telephone. Conventional telephone instruments are available as multi-line telephones, wherein the user may select any one of several (e.g. five) telephone lines to transmit or receive a telephone call. Line selector push-buttons normally are provided in a so-called "key set" for this purpose. Recently, telephone instruments have incorporated therein automatic dialing devices capable of dialing any one of several preset multi-digit telephone numbers upon the simple actuation of an associated push-button. Accordingly, several important telephone numbers may be assigned to respective pushbuttons; and the selection of any one of those pushbuttons effects the automatic dialing of its assigned telephone number. Of course, the requisite telephone instrument adds to the equipment on an executive's desk.

It often is necessary to limit unauthorized use of a telephone and thereby prevent expensive toll calls from being made. Many PBX telephone systems include a feature by which the dial-out capability of selected telephone instruments can be limited by, for example, area code or telephone exchange. Often, however, special technicians are needed to release such dial-out limitations or to designate additional telephones as having such limited dial-out capabilities. Many telephone systems do not permit the programming of individual telephone instruments with different dial-out capabilities.

Notwithstanding the application of conventional communication technology to the office environment, messages from, for example, a central supervisory station to a remote location often are transmitted by way of written notes. For example, an individual who is otherwise engaged may be apprised of an incoming telephone call only upon the delivery to him of a written note from, for example, the office telephone operator. Similar other short textual messages, such as notification of a meeting, a request for his presence, etc., likewise are transmitted primarily by written notes. Although intraoffice communication may be improved by means of a network of microcomputers, such a network is quite expensive and often unwarranted.

Similarly, a central operator, such as a receptionist, a supervisor, or the like, may be notified of certain information or events by written or audible messages. For example, an executive engaged in conference may send a written message to a supervisory operator that he is not to be disturbed. Another executive may notify that operator of the fact that he is temporarily away from his office. These and other messages often are delayed in being received by the supervisory operator thus impeding the value and utility of those messages. It would be advantageous if certain predetermined messages were transmitted from any remote station, or office, to a central station, such as a supervisory console, merely by the simple actuation of a single pushbutton.

It would be desirable to provide a single terminal which accomplishes all of the individual functions carried out by the respective devices mentioned above.

OBJECTS OF THE INVENTION

Therefore, it is an object of the present invention to provide apparatus and a method for operating the same which overcomes the aforedescribed disadvantages and problems.

Another object of this invention is to provide a programmable telephone/dictation terminal.

A further object of this invention is to provide a programmable telephone/dictation terminal which can be easily programmed by a user to carry out different operating functions merely upon the simple operation of a pushbutton that has been programmed to implement that function.

An additional object of this invention is to provide a programmable telephone/dictation terminal that can be used in conjunction with dictation equipment such that the very same terminal is adapted to transmit and receive telephone calls as well as record dictation.

Another object is to provide a system having a terminal of the aforementioned type whereby a user may record dictation on a central dictation system that is accessed by that terminal.

A still further object of this invention is to provide a system of the aforementioned type in which certain textual messages may be transmitted from a supervisory station to a terminal disposed at a remote station whereat the textual message may be displayed to a user.

It is yet another object of this invention to provide a system of the aforementioned type in which certain pushbuttons (or equivalent) at each terminal are programmed to cause certain messages to be displayed at the central station merely upon the actuation of such pushbuttons.

An additional object is to provide a programmable telephone/dictation terminal which can be used with one or more telephone lines to couple one or more recorders to those lines for the selective recording of incoming telephone messages.

A still further object is to provide a programmable telephone/dictation terminal of the aforementioned type which operates with one recorder as a telephone answering machine and with another recorder to record remotely-transmitted dictation, both recorders operating substantially independently of each other.

A further object of this invention is to provide a programmable telephone/dictation terminal having desirable telephone-related features, such as automatic telephone number dialing, selective dial-out disabling, changeable audible ringing tones, etc.

Another object of this invention is to provide a method of programming a telephone/dictation terminal to carry out one or more available operating functions such that, once the terminal is suitably programmed, selected functions may be implemented easily.

Various other objects, advantages and features of the present invention will become readily apparent from the ensuing detailed description, and the novel features will be particularly pointed out in the appended claims.

SUMMARY OF THE INVENTION

In accordance with this invention, a programmable telephone/dictation terminal is provided with programmable function keys, each of which may be programmably assigned by a user of that terminal with a particular operating function that is initiated upon the actuation of that key. Advantageously, the terminal is disposable in at least a telephone mode, by which communication with a telephone network is initiated, or a dictation mode, by which the user may record dictation.

In accordance with one aspect of this invention, the terminal is provided with a display that is used both during a programming mode (i. e. while assigning particular operating functions to the programmable keys) and during an operating mode. During programming, the display provides prompt messages to facilitate the various steps included in a programming operation. During operation, the display indicates the mode of operation of the terminal and also provides a visual display of various messages that have been received.

As a feature of this invention, the terminal may be programmed for connection to a central dictation system, as by so-called private wire coupling. The same terminal is operable in another mode for use with a desk-top dictating machine. When used with such a machine, audio messages that are dictated by the user of the terminal are recorded directly on the desk-top machine. Additionally, the terminal may be programmed to permit audio messages received from one or more telephone lines to be recorded. In this latter mode of operation, the combination of the terminal and a desk-top dictating machine may function as a telephone answering device, a dictating machine for the recording of remote dictation, or a simple telephone message recorder. In one embodiment, the terminal cooperates with two desk-top dictating machines to connect these machines to respective telephone lines such that the machines may operate substantially independently of each other as, for example, telephone answering machines, remote dictation machines or telephone message recorders.

As another feature of this invention, the telephone/dictation terminal includes automatic dialing means which, upon operation, initiates the dialing of different preset telephone numbers. In the preferred embodiment, manual dialing means, such as a pushbutton keypad, also are provided. In accordance with another advantageous feature, the terminal may be programmed to inhibit or limit the dial-out capability of the aforementioned dialing means. For example, the terminal may be limited to dialing only local telephone numbers or certain telephone extensions in, for instance, a PBX system.

As yet another feature of this invention, the programmable telephone/dictation terminal is adapted to be provided in a remote station included in a centralized system having a central station, such as a supervisory station. Textual messages generated at the central station may be transmitted to one or more remote stations for display at the terminal. As one aspect of such a system, certain programmable keys at each terminal are operable to transmit to the central station signals representing certain messages which then may be displayed to a supervisory operator or at another terminal.

The present invention also provides a method by which various ones of the programmable keys provided at the telephone/dictation terminal may be programmed to carry out the aforementioned functions.

BRIEF DESCRIPTION OF THE DRAWINGS

The following detailed description, given by way of example, will best be understood in conjunction with the accompanying drawings in which.

DETAILED DESCRIPTION OF A CERTAIN PREFERRED EMBODIMENT

Figure 1:
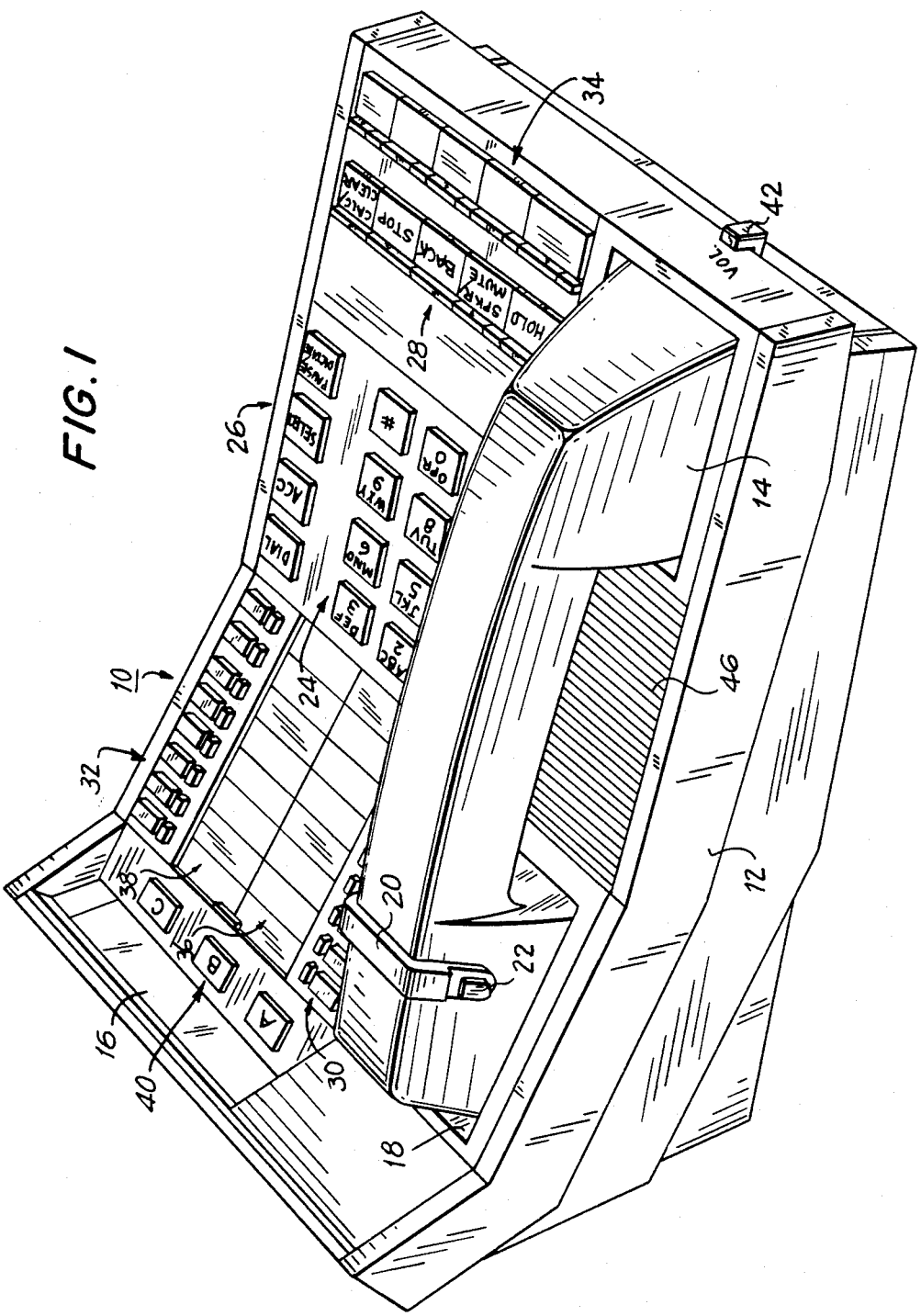
FIG. 1 is a perspective view of a preferred embodiment of the programmable telephone/dictation terminal of the present invention.
Figure 2:
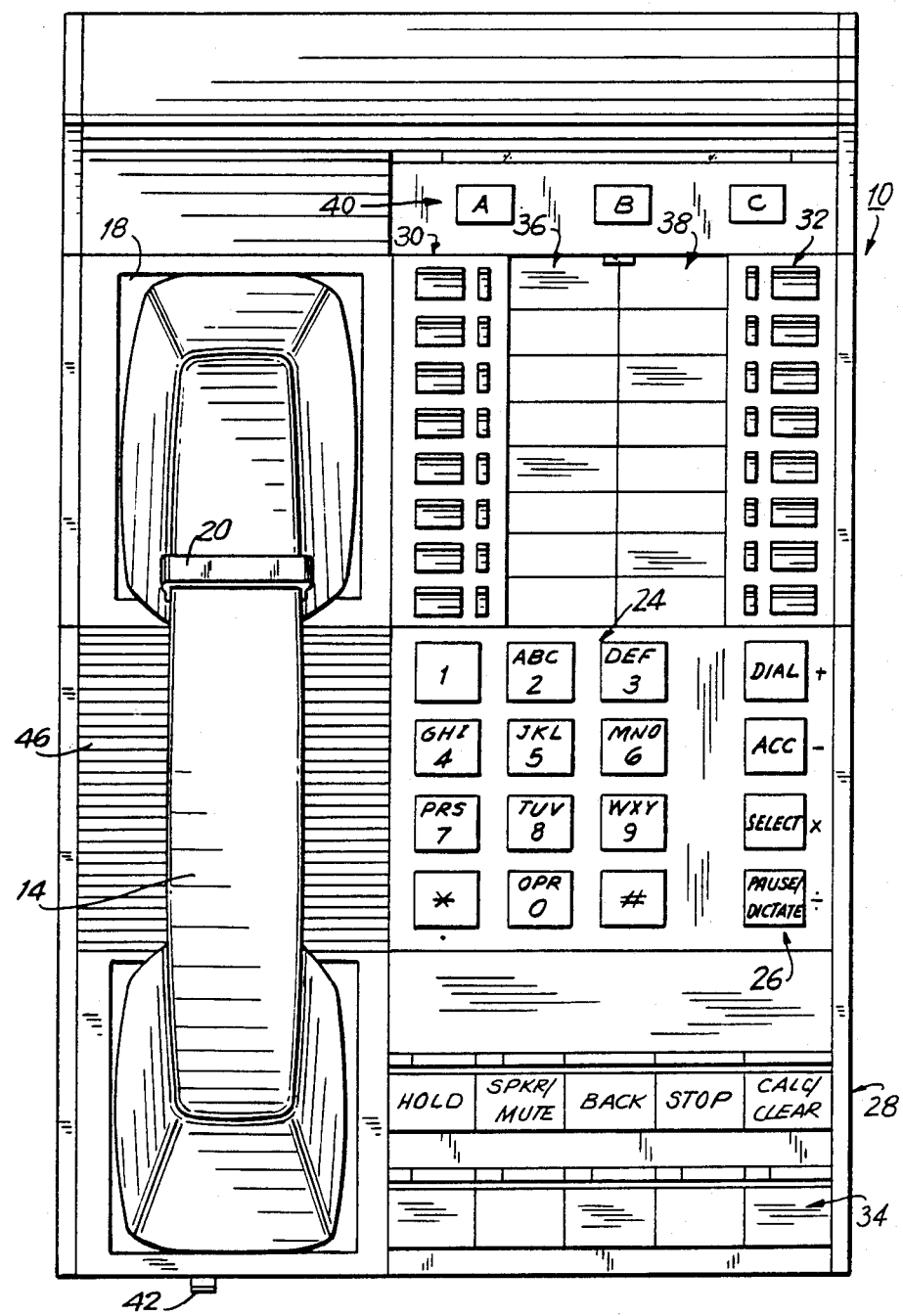
FIG. 2 is a top view of the aforementioned terminal.

Referring now to the drawings, and in particular to FIGS. 1 and 2, there is illustrated a preferred embodiment of a telephone/dictation terminal 10 which incorporates the various features and aspects of the present invention. It will be appreciated that various selector elements are shown and described herein, such selector elements being referred to as "keys" or "pushbuttons". Such selector elements merely are illustrative, and it is contemplated that a greater or lesser number of selector elements may be included in the telephone/dictation terminal. Also, other conventional switching devices may be used in place of the keys or pushbuttons described herein, such as spring-actuated toggle switches, two-position switches, and the like.

Telephone/dictation terminal 10 is comprised of a housing 12 containing electrical circuitry of which the terminal is constructed. As will be described, such circuitry includes a digital processor, such as a microprocessor, one example of which is the Hitachi Model 6303. Other circuitry is included within housing 12, and such additional circuitry is represented in block diagram form (FIG. 4 below) in view of the fact that one of ordinary skill in the art clearly is cognizant of such circuitry and could purchase or assemble such circuitry without undue experimentation.

Telephone/dictation terminal 10 is provided with a handset 14 having a speaker and a microphone therein, similar to handsets normally provided in conventional telephone instruments. Handset 14 is accommodated in a cradle 18 which includes a hook switch (not shown) whose function is similar to the conventional hook switch normally provided in telephone instruments. As used in this specification, when handset 14 is disposed within cradle 18, the hook switch is opened and the handset exhibits its "on-hook" condition. Conversely, when handset 14 is removed from cradle 18, the hook switch is closed and the handset exhibits its "off-hook" condition.

Handset 14 differs from conventional telephone handsets by the addition thereto of a dictation control yoke 20 and a dictation control button 22. Such a handset having a yoke and control button for the purpose of controlling various dictate functions is known to those of ordinary skill in the art and is described in, for example, U.S. Pat. No. 3,872,263, assigned to the assignee of the present invention. As will be appreciated by those of ordinary skill in the art, yoke 20 is spring-loaded and commands a rewind operation when moved by an operator in an upward direction (when it is moved to the left as viewed in FIG. 1) and commands a stop operation when moved in the opposite direction. A dictate operation is commanded when dictate control button 22 is depressed. The need for such dictate control functions will be appreciated from the description set out below.

Although not shown, it will be appreciated that a suitable electrical connection is provided between handset 14 and the electronic circuitry included within housing 12. Such electrical connection permits dictate control signals to be transmitted from the handset to the electronic circuitry and also permits audio signals to be communicated between the handset and such circuitry. Also not shown are suitable electrical conductors by which the electronic circuitry included within housing 12 is energized by a suitable power supply. Furthermore, electrical conductors (not shown) serve to couple telephone/dictation terminal 10 to one or more telephone lines. Still further, and as will be described below, the telephone/dictation terminal may be included in a system having a central station, also referred to as a supervisory station, and one or more remote stations at which one or more terminals 10 are disposed. A suitable digital communication link extends between terminal 10 at a remote station and the central station. Reference is made to copending application Ser. No. 895,006, assigned to the assignee of the present invention, for a description of such a system in which central and remote stations are interconnected by means of a digital communication link.

Terminal 10 includes a display 16 adapted to provide alphanumeric indications to a user, such alphanumeric indications constituting displayed messages which are described in greater detail below. As one example, display 16 comprises an LCD display capable of displaying two lines of alphanumeric characters, each line being capable of displaying sixteen characters, each character being formed of a $5 \times 7$ dot matrix. However, other alphanumeric displays may be provided, as desired, such as LED, fluorescent, incandescent and plasma displays, known to those of ordinary skill in the art. Additionally, if economically advantageous, display 16 may comprise a "mini" CRT device.

On the outer surface of housing 12 of telephone/dictation terminal 10 are provided various keys, including a pushbutton keypad 24, preset function keys 26 and 28, user programmable keys 30, 32 and 34 and "soft" keys 40. Terminal 10 is adapted to communicate with a telephone network, that is, it is adapted to receive and initiate telephone calls. Since most telephone calls are initiated by dialing a desired telephone number, keypad 24 may comprise a conventional $3 \times 4$ telephone-type pushbutton array. The pushbuttons included in keypad 24 are designated with the conventional symbols normally provided on such conventional telephone pushbuttons. It will be appreciated that a user of terminal 10 may initiate a telephone call by depressing appropriate ones of these pushbuttons to "dial" a desired telephone number. As is known to those of ordinary skill in the art, if terminal 10 is connected to a telephone line capable of operating with "Touch Tone" service, conventional dual frequency tones are generated in response to the actuation of pushbutton keypad 24. Alternatively, if terminal 10 is connected to a telephone line on which only "pulse dialing" service is available, the actuation of pushbutton keypad 24 results in the generation of conventional dialing pulses. As will be described below, keypad 24 also may be operated as a calculator, or to generate numerical indications, or to generate alphabetical indications.

Preset function keys 26 and 28 preferably are provided in separate arrays, with keys 26 being arranged in a column adjacent keypad 24 and keys 28 being arranged in a row in the vicinity of the front, or leading edge, of terminal 10. Function Keys 26 include a DIAL key which, when actuated, commands a dial-out operation. As will be described, terminal 10 includes automatic dialing means which, when operated, results in the display of a particular telephone number. Once a telephone number is displayed, the actuation of the DIAL key causes the tones or pulses associated with that displayed telephone number to be generated. Also, terminal 10 permits the automatic redialing of a telephone number that had last been dialed. Actuation of the DIAL key causes that last-dialed number to be displayed on display 16. Reactuation of the DIAL key results in the actual dialing of that displayed telephone number.

Function keys 26 also include an ACC key which, for example, may be actuated to initiate the operation of a telephone accessory (not shown) that may be connected to terminal 10. A SELECT key also is included in function keys 26, this SELECT key being operable during a programming mode, as will be described. For example, when entering desired telephone numbers for use by the aforementioned automatic dialing means included in terminal 10, operation of the SELECT key is indicative of the end of a desired number (which may be, for example, a 2, 3, 4, 5 or 6-digit extension, a 7-digit "local" telephone number, a 10-digit long distance telephone number or a multi-digit computer-accessed telephone number. Also, and as described in copending application Ser. No. 895,001, entitled "Telephone Creating and Searching", a directory of names may be stored in terminal 10, these names being spelled in a letter-by-letter basis, and each letter being selected by the actuation of keypad 24. The operation of the SELECT key indicates the entry of a desired letter.

Function keys 26 also include a DICTATE/PAUSE key which, when actuated, places terminal 10 in a dictate (or, as will be described, a transcribe) mode of operation by which audio messages may be dictated onto dictation equipment coupled to the terminal. This key also may be operated while a telephone number is being generated and stored in the automatic dialing means included in terminal 10 for the purpose of imparting a "pause" in the dial-out operation, as may sometimes be necessary. For example, in some PBX systems, a "pause" to permit dial tone detection may be necessary in order to complete a dial-out operation.

Function keys 26 also may operate to carry out the indicated addition, subtraction, multiplication and division functions when keypad 24 is operated as a calculator.

Function keys 28 include a HOLD key which may operate to place a telephonecall "on hold", as is conventional in multi-line, keyset telephone instruments.

Function keys 28 also include a SPEAKER/MUTE key which, when actuated, establishes a "speakerphone" mode of operation of terminal 10. The terminal includes a loudspeaker 46 together with a microphone (not separately designated) by which telephone communication may proceed while handset 14 is in cradle 18. A preferred feature of terminal 10 is the ability to enable speaker 46 to operate when handset 14 is removed from cradle 18, while enabling only the microphone within the handset to operate. This mode is established when the SPEAKER/MUTE key is actuated when handset 14 is off-hook, whereupon the built-in microphone in housing 12 is disabled, or muted. During normal speakerphone operation, the actuation of the SPEAKER/MUTE key continues to enable the operation of speaker 46 while muting the operation of the built-in microphone.

Function keys 28 also include a BACK key which, when actuated, effects a backward scrolling of alphanumeric messages displayed on display 16. For example, telephone directory information is included in terminal 10 for use in conjunction with the automatic dialing means therein. Each directory entry may be displayed on display 16, and a user of the terminal may scroll through those entries by operating the BACK key. Also, and as will be described, incoming telephone messages may be recorded on a local desk-top dictating machine connected to terminal 10 (shown, for example, in FIG. 3). As each incoming message is recorded, data relating to that message, such as its length, its time of recording, and its position in a sequence (e.g. the first, second, third, etc. message) is stored. This data may be displayed on display 16, and the user may scroll through such data by operating the BACK key. Likewise, when terminal 10 is connected in a centralized system of the type wherein text messages may be transmitted to the terminal from a central supervisory station, such messages are stored and may be displayed on display 16. The user may scroll through those stored messages by operating the BACK key.

As another usage of the BACK key, operation thereof during, for example, a programming mode by which functions are assigned to selected programmable keys, or certain functions are implemented, as will be described below, permits sequential operations to be "backed up". Errors may be corrected easily; and certain steps that are executed during subroutines may be re-executed.

Function keys 28 also include a STOP key which, when actuated, terminates whatever routine then is being executed by the microprocessor included in terminal 10, as will be described. Also included in these function keys is a CALCULATOR/CLEAR key which, when actuated, establishes a calculator mode of operation by which keypad 24 and function keys 26 operate in a manner substantially similar to that of conventional desk-top (or pocket) calculators.

User programmable keys 30 and 32 are arranged in two columns, as illustrated. As a numerical example, each column includes eight separate keys and, typically, each key may be programmed to initiate the dialing of a predetermined telephone number. It is contemplated, however, that other functions may be assigned to respective ones of these keys, as will be described below. Adjacent keys 30 is a column of paper inserts 36 which, typically, the user will inscribe with information relating to the particular function that has been assigned to an adjacent key. For example, the identity of a telephone number with which one of these keys is programmed may be inscribed on its associated paper insert. As another example, if terminal 10 is used in conjunction with a plurality of telephone lines, selected ones of keys 30 and 32, as selected by the user, may connect the terminal to respective ones of those telephone lines. The identities of the respective telephone lines that have been assigned to those keys may be indicated by appropriate inscription on paper inserts 36, 38.

Preferably, each of programmable keys 30 and 32 is provided with a suitable visual indicator, such as an LED, that is selectively energized when that key is actuated. Preferably, if a programmable key 30 or 32 is programmed to initiate the dialing of a predetermined telephone number, the LED associated with that key is not energized. However, the selection of other programmed functions is indicated by the LED. The LED may be formed as an integral part of the key or, alternatively, a separate LED positioned adjacent the key may be provided. It will be appreciated, although not mentioned above, that similar LED's may be associated with the respective keys included in preset function keys 28.

As a function that has been programmed for a particular one of programmable keys 30 and 32 changes, the identification of that function, as inscribed on an associated paper insert, may be readily changed.

Figure 3:
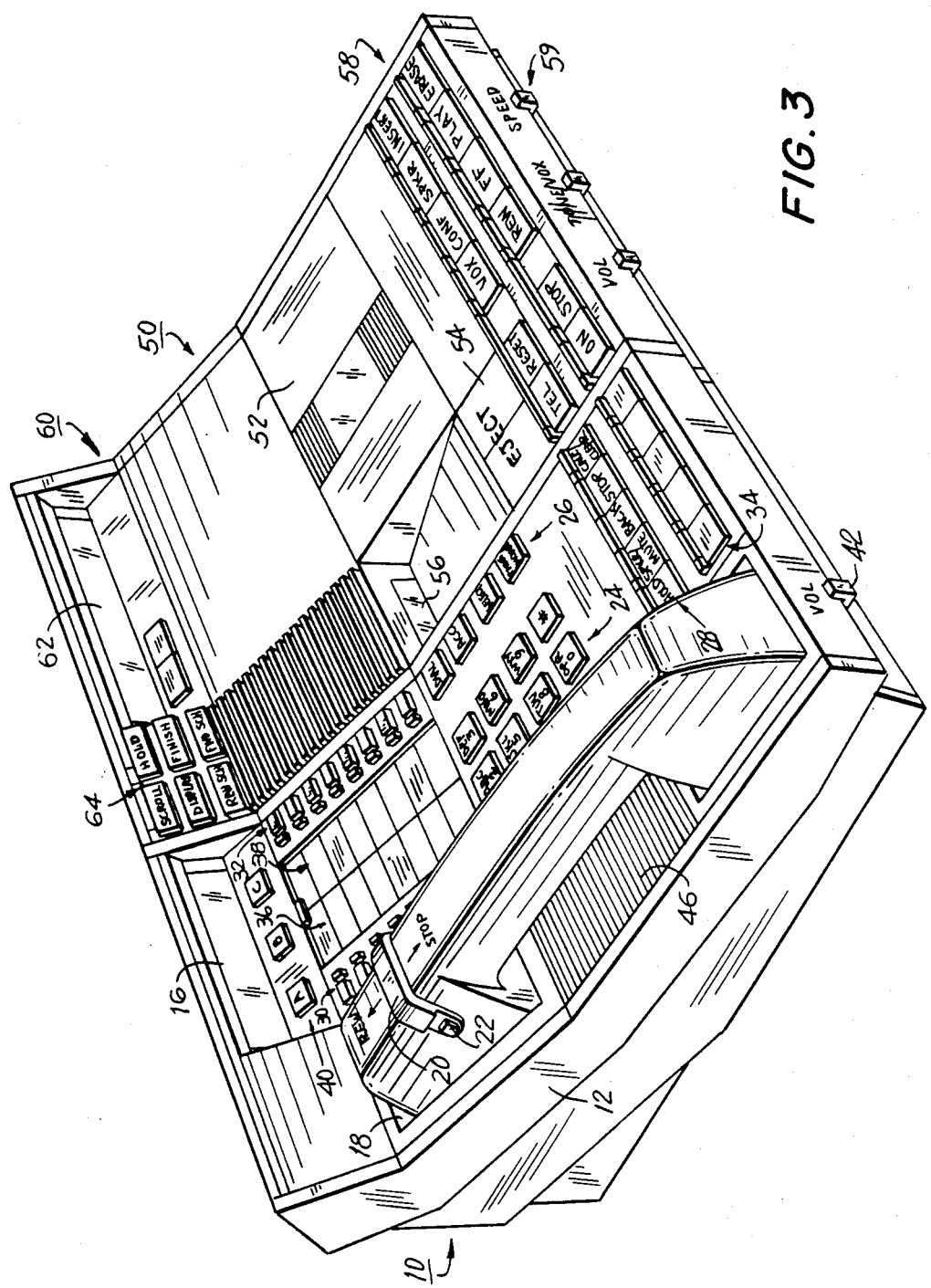
FIG. 3 is a perspective view of the aforementioned terminal electrically and physically connected to a desk-top dictating machine.

Programmable keys 34 are similar to programmable keys 30 and 32; and each of keys 34 may be provided with an LED formed adjacent to or integral with that key. When one of keys 34 is actuated, either during a programming mode (to be described) by which a function is assigned to that key, or during an operating mode wherein the assigned function is selected, the associated LED is energized. It will be appreciated that any programmable function may be assigned to any one of keys 30, 32 and 34. The particular location of these keys on housing 12 does not limit the functions with which those keys may be assigned. Examples of such functions include the following: central dictation, whereby terminal 10 is connected, as by private wire, to a central recorder such that information dictated at terminal 10 is recorded at the central recorder; telephone line selection, whereby terminal 10 is connected to a desired one of plural telephone lines, the particular line to which the terminal is connected being selected by the operation of an appropriate one of the programmable keys; telephone message recording, whereby an incoming message that is received over a selected telephone line is recorded on the local desk-top dictating machine connected to terminal 10 (such as shown in FIG. 3); dial-out inhibiting, whereby the use of keypad 24 or programmable keys 30, 32 and 34 which are assigned with desired telephone numbers may be inhibited, thus acting as a "telephone lock"; delayed ringing, whereby an audible ringing sound is not generated until a preset number of telephone call ringing signals has been received. The programmable keys also are capable of being programmed to initiate other functions, such as a momentary telephone line "flash", a connection of a modem through terminal 10 to a telephone line to transmit or receive data, and the connection through terminal 10 of a printer to, for example, a microcomputer.

Terminal 10 also is provided with "soft" keys 40. In the preferred embodiment, three such soft keys are provided, and they are designated keys A, B and C. As is understood by those of ordinary skill in the art, a "soft" key cooperates with a microprocessor to supply different commands and functions to that microprocessor, depending upon the particular routine which is in the process of being executed. That is, a soft key is not dedicated to a particular, predetermined function or command, for all routines and for all operating states of the microprocessor. A given soft key, such as key A, may be operated a first time to represent a first command and then, as the microprocessor continues its routine, it may be operated a second time to represent a second, different command. Preferably, soft keys 40 are aligned with display 16 and cooperate with that display and with the microprocessor included in terminal 10 such that the operation of selected ones of these soft keys, as "prompted" by an alphanumeric message displayed on display 16, enables the microprocessor to continue with a particular routine then being executed. The manner in which soft keys 40 are operated to carry out and control the programming of programmable keys 30, 32 and 34 will be explained in greater detail herein below in conjunction with the accompanying flow charts.

Terminal 10 also is provided with a volume control 42, seen to be disposed along the leading edge of housing 12. Volume control 42 is adapted to set and adjust the audible volume output of speaker 46 when terminal 10 operates in the aforementioned speakerphone mode. This control also enables the user of terminal 10 to adjust the volume of the speaker included in handset 14, as may be desired.

Before describing typical operations that may be carried out by terminal 10, reference is made to FIG. 3 which illustrates the electrical and physical interconnection between terminal 10, a record/playback module 50 and a display module 60. Record/playback module 50 comprises a desk-top dictating machine and is adapted to carry out typical dictating functions by which audio messages may be recorded on and reproduced from the record medium. Typically, the record medium comprises a magnetic tape and this tape may be housed in a suitable cassette, such as a standard cassette, a minicassette, a microcassette or a picocassette of the type described in, for example, U.S. Pat. No. 4,443,827, assigned to the assignee of the present invention. Other record media may be used, such as magnetic disks or magnetic belts. Also contemplated is a solid-state storage device, such as a magnetic bubble array or semiconductor memory chips of the type conventionally used in digital storage devices. For convenience, however, it will be assumed that the record medium is a magnetic tape cassette.

Record/playback module 50 may be of the type described in copending application Ser. No. 895,006. Display module 60, which is electrically and physically connected to module 50, provides visual indications of the types of messages which are recorded by module 50, and also provides information relating to the activity of this module. Display module 60 is described in copending application Ser. No. 894,993, entitled "Display for Modular Dictation/Transcription System" and assigned to the assignee of the present invention. The disclosure of the aforementioned copending applications are incorporated herein by reference.

Record/playback module 50 is adapted to record audio messages which are produced by the use of telephone/dictation terminal 10. Such audio messages may be dictated by a user via handset 14 or may be received by the terminal over one or more telephone lines. Record/playback module 50 thus is capable of cooperating with telephone/dictation terminal 10 to function as a telephone answering machine, to record telephone-transmitted dictation from a remote location or to record a telephone conversation, as will be described in greater detail below.

Record/playback module 50 includes a cassette compartment (not shown) protected by a door 52 which, when opened, provides access to that compartment for the loading and unloading of a magnetic tape cassette. An eject button 54 is provided by which a loaded cassette is ejected from the module, resulting in the opening of door 52 and facilitating the removal of that cassette from the cassette compartment. Module 50 also is provided with a display 56 which, typically, provides an indication of the relative position of the recording tape as it is transported during record and playback modes of operation. As an example, display 56 provides a visual indication of a simple 3-digit tape count or, alternatively, a 3-digit time-related representation such as 5.0 minutes, 10.3 minutes, etc.

The record/playback module also is provided with various pushbuttons 58 which, when actuated, effect the operations generally designated on those pushbuttons. For example, an ON button is adapted to actuate module 50 to its active mode, whereby dictating operations may be carried out. A TELEPHONE button enables record/playback module to record telephone calls which are received or made by telephone/dictation terminal 10. As will be described below, when terminal 10 is conditioned to record incoming telephone calls, the telephone button on module 50 should be actuated. A RESET button functions to reset display 56 to a preset indication, such as "000". This RESET button also may be actuated to reset the display provided on display 62 (to be described) of display module 60. A STOP button included in pushbuttons 58 establishes a quiescent mode of operation for module 50. Typically, the STOP button is actuated to terminate a fast-forward, rewind, playback or record mode of operation.

A VOX button, when actuated, enables record/playback module 50 to record audio messages so long as a speech signal is present. That is, recording tape is advanced in the presence of such speech signals and is stopped when those speech signals terminate. Such voice-operated recording is well known to those of ordinary skill in the art. A CONFERENCE button establishes a "conference" mode of recording whereby the amplification of audio signals recorded on the magnetic tape is increased. Preferably, the CONFERENCE button is used in conjunction with a conference microphone (not shown) which, when connected to module 50, permits the recording of a conference among individuals. A SPEAKER button enables the activation of an internal speaker (not shown) provided in module 50. When audio messages recorded on the magnetic tape are played back, such messages are reproduced by that internal speaker. Usually, when handset 14 is used to record dictation, the internal speaker of module 50 is not used. An INSERT button is adapted, when actuated, to establish an "insert" mode of operation whereby audio information is recorded onto a separate channel, or track of the magnetic tape. This feature enables a user to dictate additional material without editing the message which has already been recorded.

A REWIND button, when actuated, rewinds the magnetic tape at a relatively high speed until, for example, the beginning of the tape is reached or the STOP button is actuated. Conversely, a FAST FORWARD button serves to advance the magnetic tape at a relatively high speed. A PLAY button, when actuated, advances the magnetic tape at its normal speed, whereby audio messages recorded thereon are played back. Such played back messages may be reproduced by the internal speaker of record/playback module 50. An ERASE button is adapted to be actuated concurrently with either the REWIND button or the FAST FORWARD button so as to establish an "erase" mode. An electromagnetic erase circuit (not shown) is triggered to erase audio information which may have been recorded previously on the magnetic tape.

Module 50 also is provided with adjustable controls 59 which, for example, may comprise adjustable sliders similar to sliders 42 and 44 of telephone/dictation terminal 10. Adjustable controls 59 include a volume adjustment for adjusting the volume of the audio signals played back through, for example, the internal speaker of module 50, a tone/vox adjustment which adjusts the base and treble response characteristics of the played back audio signals or, alternatively, when the VOX button is actuated, adjusts the sensitivity of the vox circuit (not shown) normally provided in this module. Tape speed during a playback operation may be selectively increased or decreased by adjustment of the illustrated speed control.

Display module 60 is described in greater detail in copending application Ser. No. 894,993 and also in copending application Ser. No. 895,011, entitled "Display for Modular Dictation/Transcription System", the disclosures of which are incorporated herein by reference. This display module includes a display 62 which provides both graphical and digital displays. As described in the aforementioned copending applications, the graphical displays provide visual information regarding the type and length of each recorded message and also provide displays indicative of the locations of recorded instructions and "special" notes. In addition, a cursor display is provided to indicate the present position of the magnetic tape as it is transported during various dictate operations. The digital display indicates the total length of dictation in minutes and tenths of minutes as such dictation is recorded. Other information also is provided by the digital display during transcribe operations, such additional displays forming no part of the present invention per se.

Display module 60 also is provided with display control buttons 64. The functions carried out by the individual control buttons are represented by the legends provided on each such button. The SCROLL button, when actuated, permits a user to "scroll" through the various types of messages that may be recorded, such as letters, "priority" letters, instructions or "special" notes. One of these types of messages may be selected for rapid access, as described more particularly in the aforementioned copending applications.

A DISPLAY control button may be selectively actuated to scan a dictated magnetic tape for the purpose of detecting information recorded thereon representing the various types, lengths and locations of messages. This information is used to control display 62 to provide the aforementioned graphical display which is most helpful in preparing for transcription of dictated information. A REWIND SEARCH control button, when actuated, causes the magnetic tape to rewind in order to access a selected type of message. Message selection is made by the operation of the SCROLL button, as mentioned above.

Display control buttons 64 also include a HOLD button which, essentially, "freezes" the information displayed on display 62 such that if a new magnetic tape is loaded into record/playback module 50, messages may be dictated on that new tape without disturbing the display associated with the previous tape. This permits dictation to be resumed on the previous tape without any confusion or ambiguity in the display.

A FINISH control button functions to record a "summary" block of data representing the types, locations and lengths of all messages recorded on a particular magnetic tape. This data, when read prior to transcription, presets display 62 to indicate the types and locations of messages which need transcription. Operation of the FINISH button during a transcribe mode serves to extinguish the display of those messages which have been transcribed.

A FORWARD SEARCH control button serves to advance the magnetic tape at a rapid rate to access a selected type of message. It is appreciated that this control button operates in a manner similar to that of the REWIND SEARCH control button.

Further description of display module 60 is found in copending applications Ser. Nos. 894,993 and 895,011.

Figure 4:
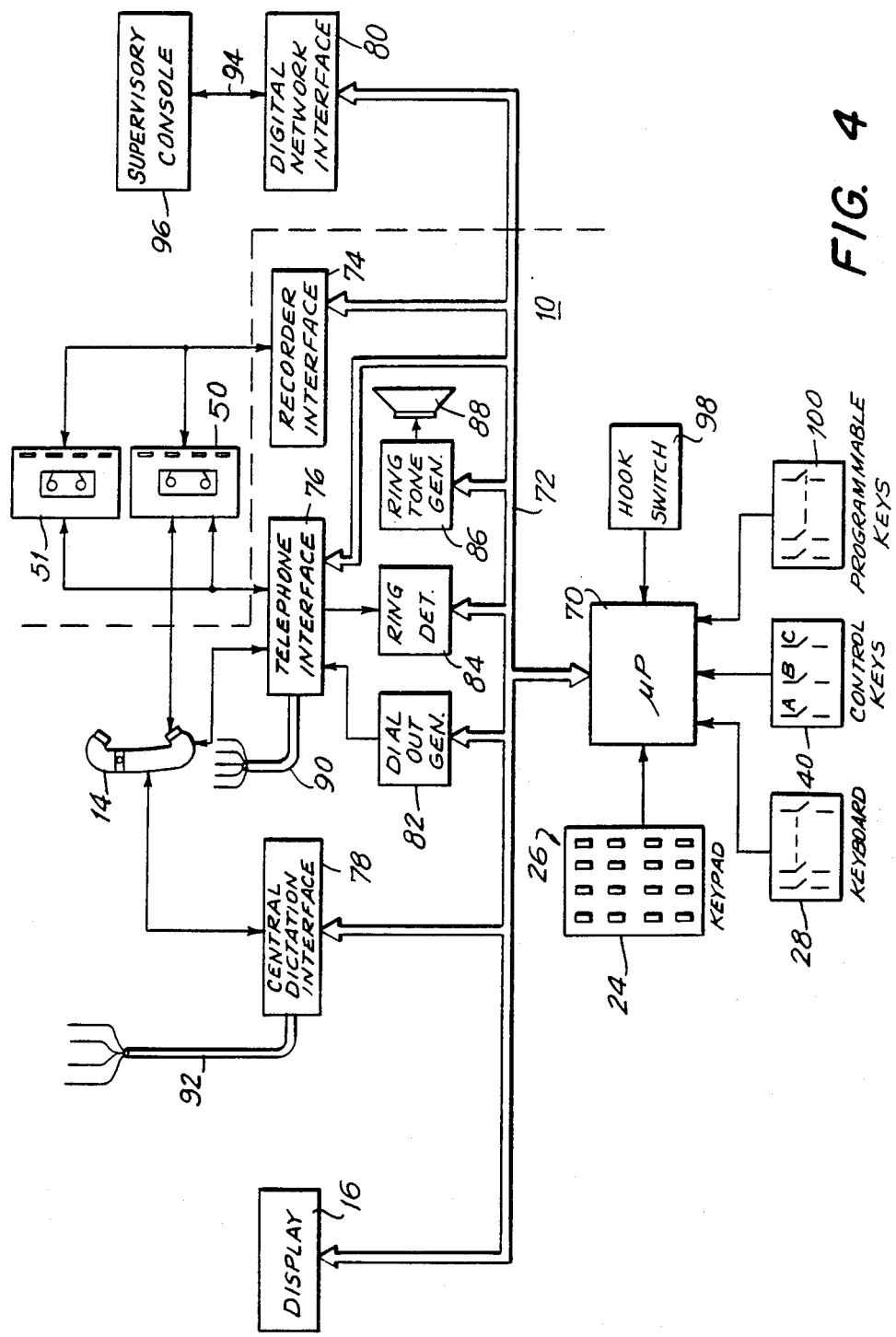
FIG. 4 is a block diagram of the electronics included in the programmable telephone/dictation terminal of the present invention.

Turning to FIG. 4, there is illustrated a block diagram of some of the relevant electrical circuitry included in telephone/dictation terminal 10. The following description will provide an understanding of the manner in which this terminal operates in conjunction with record/playback module 50, with an additional record/playback 51, with a telephone network, with a central dictation system and with a supervisory console provided at, for example, a central station. The electrical and physical connection of modules 50 and 51 which, if desired, may be further connected to display module 60, is described in copending applications Ser. Nos. 895,006 and 894,583, the latter entitled "Display for Modular Dictation/Transcription System".

The block diagram of FIG. 4 illustrates a microprocessor 70, a recorder interface 74, a telephone interface 76, a central dictation interface 78, a digital network interface 80 and various generators and detectors, to be described. Also illustrated in FIG. 4 are aforementioned pushbutton keypad 24 which, as shown, includes preset function keys 26, function keys 28 (designated as a keyboard), soft keys 40 (designated as control keys) and programmable keys 30, 32 and 34, referred to generally as programmable keys 100. Also shown in FIG. 4 is hook switch 98 which, as mentioned previously, normally is opened when handset 14 is disposed in cradle 18 and is closed when the handset is removed from the cradle. An "on-hook" condition is indicated by the opening of hook switch 98 and an "off-hook" condition is indicated by the closing of this hook switch.

As diagrammatically represented, microprocessor 70, which may be a conventional microprocessor, such as Hitachi Model 6303, is coupled to keypad 24, keyboard 28, control keys 40, hook switch 98 and programmable keys 100. The actuation of any one of the keys or switches connected to the microprocessor is detected and, in the interest of simplification, conventional interface circuitry, such as switch detectors, is omitted from the illustration.

Microprocessor 70 is coupled by way of a bus 72 to interfaces 74, 76, 78 and 80, and the microprocessor also is coupled by this bus to display 16. It will be appreciated that display 16 includes not only the visual display means shown in FIGS. 1-3 but also the usual decoder, display-driver circuitry and storage devices normally provided in microprocessor-driven displays.

Bus 72 also interconnects microprocessor 70 with a dial-out generator 82, a ringing signal detector 84 and a ringing tone generator 86. Generator 82 and detector 84 are coupled to telephone interface 76 which, in turn, is coupled to a telephone network 90 which may be, for example, a conventional PBX system, one or more telephone lines, or the like. Dial-out generator 82 may include conventional dual-tone frequency generators operable under the control of microprocessor 70 to generate conventional Touch Tone signals. Alternatively, dial-out generator 82 may include conventional means for generating dial pulses. In any event, the dialing signals, whether they be Touch Tone signals or dial pulses, are supplied to telephone network 90 via telephone interface 76.

Incoming ringing signals which are received over telephone network 90 and supplied to telephone interface 76 are, in turn, applied to ringing signal detector 84. As will be described, the ringing signal detector serves to detect the presence of an incoming ringing signal and to supply microprocessor 70 with suitable indications thereof. Ringing tone generator 86 triggers an audible tone generator 88 to generate a suitable audible tone in response to each incoming ringing signal of which microprocessor 70 is apprised. Ringing tone generator 86 is controlled by the microprocessor and, as will be described, may supply audible tone generator 88 with different audio signals for the purpose of generating characteristic tones whose distinctiveness may be varied, as desired. For example, ringing tone generator 86 may be controlled to produce a bell-type sound, a buzzer-type sound or an electronic tone of different frequency, pitch, and the like.

Telephone interface 76 also is coupled to handset 14 for the purpose of providing a communication channel between the handset and telephone network 90. Still further, the telephone interface is coupled to record/playback modules 50 and 51 to permit incoming messages received over telephone network 90 to be recorded on either of these modules, under the control of microprocessor 70, as will be described. A so-called announcement message may be recorded on one or both of record/playback modules 50 and 51, this announcement message being of the type normally used in telephone answering machines. Recorder/playback modules 50 and 51 are coupled to recorder interface 74 which, in turn, H is coupled to microprocessor 70, such that, under microprocessor control, the aforementioned announcement message may be played back and transmitted over telephone network 90 via telephone interface 76 in response to, for example, a detected incoming telephone call.

Central dictation interface 78 is coupled to microprocessor 70 and is controlled by the microprocessor to establish communication with a central recorder via a private wire network 92. As is understood by those of ordinary skill in the art, central dictation systems normally are provided with a central station having one or more recorders, each of which being accessible by a remote dictate station. When an available recorder is "seized" by a dictate station, all other dictate stations in the system are inhibited from seizing that recorder. Handset 14 is coupled to central dictation interface 78 for the purpose of controlling the central recorder to carry out a dictate operation.

If telephone/dictation terminal 10 is included in a network having, for example, a central or supervisory station, as described in copending application Ser. No. 895,006, information may be transmitted between that supervisory station and the telephone/dictation terminal. Such transmitted information, and the use thereof, is described in, for example, copending application Ser. No. 895,010, filed Aug. 8, 1986 entitled "Communications Network and Method". Digital network interface 80, which is coupled to microprocessor 70 via bus 72, is connected to supervisory console 96 by means of a digital communication link 94. Preferably, a microcomputer is located at the supervisory console; and relatively brief text messages may be generated from the supervisory console via digital communication link 94 and digital network interface 80 to microprocessor 70 for display on visual display 16. For example, in an office environment having a receptionist or supervisory telephone operator, a text message may be generated by that operator at supervisory console 96 relating to a telephone call destined for the user of telephone/dictation terminal 10. This message, when transmitted via digital communication link 94 to digital network interface 80 may be displayed on display 16. Similarly, and as will be described, the user of telephone/dictation terminal 10 may transmit a simple message via digital communication link 94 to supervisory console 96, such as "Do Not Disturb" or "Out to Lunch", etc. In accordance with an advantageous feature of the present invention, this message may be transmitted merely by operating a selected one of programmable keys 100. As described in copending application Ser. No. 895,010, such a simple message may be transmitted from terminal 10 via digital communication link 94, through supervisory console 96, via an extension of the digital communication link to another remote terminal (similar to terminal 10) for display thereat on a visual device similar to visual device 16. No operator control or intervention is needed at supervisory console 96 to affect this message transmission path. Thus, brief text messages may be communicated between telephone/dictation terminals.

The manner in which telephone/dictation terminal 10 is operated in the environment shown in FIG. 4 now will be described. It is assumed, however, that various ones of programmable keys 100 have been suitably programmed to initiate respective operating functions. The manner in which these keys are programmed will be described in greater detail below in conjunction with the flow charts shown in FIGS. 5 and 6. Let it be assumed that the user wishes to make a telephone call. In one mode, handset 14 is removed from cradle 18, thus closing hook switch 98. Microprocessor 70 responds to this off-hook condition to control telephone interface 76, whereby a connection is made to telephone network 90. The microprocessor thereafter responds to the operation of keypad 24 and controls dial-out generator 82 to supply suitable dialing signals to the telephone network. Thus, a telephone call is made. As each pushbutton of keypad 24 is depressed, the number represented by that pushbutton is displayed on display 16. Hence, not only is the telephone number dialed but it also is displayed.

In a preferred embodiment, the dialing signals initially are applied to telephone network 90 as tone (e.g. Touch Tone) signals. If, however, after the initial (or first few) tone signals have been applied, dial tone still is present on the telephone network, the dialing signals are re-applied as dialing pulses.

In the event that the called telephone number is busy, as sensed by the detection of distinctive busy tone on the telephone line, a re-dial operation is carried out at preset intervals. The number of re-dial attempts which have been previously established is displayed on display 16; and the user may change the number of re-dial attempts by operating keypad 24. As re-dialing takes place, a suitable indication thereof is provided by display 16 under the control of microprocessor 70.

Once the dialed telephone number is answered, a normal telephone conversation may ensue via handset 14. Alternatively, the user may operate the speaker/mute key, whereby terminal 10 is disposed in the aforementioned speakerphone mode of operation.

While carrying on a telephone conversation, the user may record that conversation on, for example, record/playback module 50 by depressing a preselected one of programmable keys 100. In the event that telephone interface 76 is coupled to a plurality of telephone lines, this recording operation will be carried out if the telephone call was made over the telephone line which, previously, had been selected for coupling to the record/playback module. It will be appreciated that the operation of the appropriate one of programmable keys 100 is sensed by microprocessor 70 which, in turn, turns on the record/playback module by way of recorder interface 74.

Let it be assumed that various ones of programmable keys 100 have been assigned to desired telephone numbers, such that the assigned number is dialed automatically upon the actuation of that programmable key. If handset 14 is off-hook, the actuation of a programmable key to which a telephone number has been assigned (sometimes referred to herein as the stored number key) is detected by microprocessor 70, resulting in the display of the assigned telephone number, and a dial-out operation is carried out in the same manner as if keypad 24 had been operated.

Assuming handset 14 is disposed in cradle 18, thus establishing the on-hook condition, a stored directory of telephone numbers may be displayed on display 16 by actuating any one of keys "2" through "9" of keypad 24. For example, if key "2" is depressed, an individual whose last name begins with the letter "A", together with his telephone number is displayed. Successive actuations of this key permit the user to scroll through the stored directory and observe, one-by-one, the telephone numbers of individuals whose last name begins with the letter "A" and then the telephone numbers of individuals whose last name begins with the letter "B" and then the telephone numbers of individuals whose last name begins with the letter "C", and so on. Similar scrolling is achieved by depressing keys "3" through "9". Then, once a desired name and telephone number are displayed, that telephone number may be dialed merely upon the actuation of the DIAL key.

Normally, when handset 14 is removed from cradle to establish the off-hook condition, telephone/dictation terminal 10 is in condition to operate as a telephone instrument. However, if the PAUSE/DICTATE key of preset function keys 26 is actuated, microprocessor 70 controls terminal 10 to enter into a dictate or transcribe mode with record/playback module 50, as will be described below with reference to FIG. 7. Module 50 is enabled to record dictation that may be communicated thereto from handset 14 or to transcribe previously recorded dictation. It will be appreciated that the typical dictate, playback, fast forward and stop functions normally utilized in dictation are generated by the actuation of dictate control yoke 20 and dictate control button 22 of handset 14. The magnetic tape included in record/playback module 50 thus is transported and, during a dictate operation, audio messages are recorded thereon. In addition, letter and instruction cue, signals, described in, for example, copending application Ser. No. 849,993 may be generated and recorded by operating selected control keys included in soft keys 40. Display 16 provides a visual indication of the functions that may be carried out by each of soft keys A, B and C.

In an embodiment wherein two record/playback modules 50 and 51 are interconnected in, for example, side-by-side relation, one or the other of these modules may be turned ON to have dictation recorded thereon. If both modules exhibit the ON/STAND-BY condition, a predetermined one will be activated for recording. In accordance with a preferred protocol of the system in which the present invention is used, the left-most module is adapted to exhibit priority to have dictation recorded thereon.

In addition to being able to record dictation on record/playback module 50, terminal 10 may be operated to record dictation on a remotely located dictating machine via telephone communication. An example of telephone-linked dictation is described in copending application Ser. No. 495,756, now U.S. Pat. No. 4,658,097. By using terminal 10 of the present invention, the telephone number of the remote station at which dictation equipment is located may be dialed, either by operating keypad 24, or by operating an appropriate one of the stored number keys included in programmable keys 100, or by accessing that telephone number from the stored telephone number directory included in terminal 10, and then dictation operations may ensue. Alternatively, if foot pedal switches of the type normally used to carry out a transcribe operation are connected to terminal 10, those switches may be operated to effect a transcribe operation. In this manner, a transcribe machine located at the called remote station is controlled to enable a user at terminal 10 to transcribe information that had been dictated onto that remote device.

Terminal 10 also may be used with a central recorder that is connected to the terminal by private wire network 92. In response to the actuation of a preprogrammed programmable key 100, microprocessor 70 controls central dictation interface 78 to effect the operable connection between terminal 10 and the central recorder. Dictation then may proceed by operating dictate control yoke 20 and dictate control button 22 of handset 14, in a manner similar to that described in U.S. Pat. No. 3,872,263; and display 16 provides a visual indication of this "dictate" mode.

Let it be assumed that one of programmable keys 100 has been programmed to effect a telephone message recording mode of operation by which incoming audio messages that are received over telephone network 90 are recorded on, for example, record/playback module 50. Let it be further assumed that the telephone network includes a plurality of telephone lines, any one of which may be selected for coupling incoming audio messages to the record/playback module. As will be described below, the user may select the appropriate line (or lines) for coupling to the record/playback module. Then, when an incoming telephone call is received on the selected line, the presence of that call is detected by ringing signal detector 84; and microprocessor 70 controls telephone interface 76 to couple that line to module 50. Additionally, the microprocessor controls recorder interface 74 to activate this record/playback module, whereupon the incoming audio message is recorded.

In one mode of operation, record/playback module 50 operates as a telephone answering machine. In this regard, the user first records an announcement message on the magnetic tape of the record/playback module such that, in response to a detected incoming telephone call, the module is turned on to play back the announcement message and thereafter the operating mode of this module is changed over to enable it to record the expected incoming audio message. One example of the use of a dictating machine as a telephone answering machine is described in U.S. Pat. No. 4,309,571. Alternatively, if record/playback modules 50 and 51 both are provided, one of these modules may have the aforementioned announcement message recorded on the magnetic tape therein and the other module may be used to record incoming audio messages. Then, in response to an incoming telephone call, microprocessor 70 controls recorder interface 74 to turn on the module having the announcement message and then, after that message is played back, the recorder interface turns on the other module to permit the expected incoming audio message to be recorded on it. In the event that the incoming message recording capacity of this other module is exhausted, further incoming messages are recorded on the module having the announcement message thereon. In this case, the latter module operates as described in U.S. Pat. No. 4,309,571.

In a similar mode of operation, terminal 10 may be used in conjunction with record/playback module 50 to record dictation that may be transmitted via telephone network 90 by the user of this terminal. Optionally, the user may wish to record an announcement message on the magnetic tape included in module 50 to remind him of the fact that, if he telephones this terminal on a previously selected telephone line, he may initiate a dictation operation. Such an announcement message is optional and, if desired, it may be omitted by the user.

By using two record/playback modules 50 and 51, programmable keys 100 may be operated in conjunction with keypad 24 and control keys 40 to select one telephone line (or one group of telephone lines) for coupling to, for example, module 50 and another telephone line (or another group of telephone lines) for coupling to module 51. One of these modules then may be configured as a telephone answering machine, as mentioned above, and the other module may be configured to record remote dictation transmitted over telephone network 90 in the manner mentioned above. Microprocessor 70 cooperates with telephone interface 76, ringing signal detector 84 and recorder interface 74 to turn on the appropriate one of modules 50 and 51 to record incoming messages, depending upon the particular telephone line on which an incoming ringing signal is detected. Preferably, if module 50 is in operation, e.g. it is recording an incoming message or it is recording dictation, module 51 may operate concurrently to record an incoming message. This illustrates the independent operation of the two modules.

Advantageously, upon the recording of an incoming message, be it during a telephone answering mode of operation or a remote dictation mode of operation, microprocessor 70 controls display 16 to provide a visual indication of the receipt and recording of such messages. Each message is numbered in sequence, and its time of recording and length are stored. The user of terminal 10 may retrieve all or simply desired ones of such recorded messages. For example, by operating keypad 24, such as by depressing the "*" pushbutton, microprocessor 70 controls display 16 to display the number of the latest message which was received, its time of recording and its length. A prompt message also is displayed; and the user then may operate a designated one of control keys 40 to retrieve that message, which then is played back. If the user does not wish to listen to the displayed message, he need merely re-depress the * pushbutton, whereupon display 16 displays the first of the received messages, its time of recording and its length. The foregoing operation then may be repeated either to scroll forward through all of the received messages or to select desired ones for playback.

Assuming that a central station, such as supervisory console 96, is connected to terminal 10 by way of digital communication link 94 and digital network interface 80, text messages may be transferred between the supervisory console and the terminal. For example, relatively short text messages may be generated at the supervisory console by, for example, the operation of a suitable keyboard. This text message then is transmitted via digital communication link 94 in conventional digital format. Such text message may be directed to a particular one of several terminals 10 included in an overall system, or the message may be directed to all terminals. Upon receipt of this message by digital network interface 80, a suitable indication is transmitted to microprocessor 70; and the microprocessor then controls display 16 to provide a visual indication of the receipt of this text message. The text message is stored in a suitable memory (not shown) and may be accessed and displayed on display 16 when the user operates keypad 24. For example, if the # pushbutton is depressed, the most recently received text message is displayed. The aforementioned memory permits plural text messages to be stored, and the user may scroll through those messages by successive depressions of the # pushbutton. As each message is retrieved from the memory, it is displayed on display 16.

If the received text message includes a telephone number, for example, if the received text message states: "Call Mr. Smith (703) 555-2801", that telephone number will be displayed on display 16 when the stored message is retrieved. If the user then depresses the DIAL pushbutton, the telephone number which is displayed is dialed automatically in the manner discussed above.

In an overall system having several terminals 10 connected by digital communication link 94 to a supervisory console (or central station), certain ones of programmable keys 100 may be assigned predetermined, standard messages, such as "Do Not Disturb", "Out to Lunch", etc. By actuating an appropriate one of these programmable keys, microprocessor 70 controls digital network interface 80 to transmit one or more signals to supervisory console 96, which signals are interpreted to result in the display of the assigned message. It is appreciated that a simple message identification code is all that need be transmitted to effect this display. The full text messages may be stored in a suitable look-up table at the supervisory console, which table is accessed by the received message identification code.

The various routines that may be carried out by microprocessor 70 to achieve the aforementioned functions and operations now will be described in conjunction with the flow charts shown in FIGS. 5-8. In addition to illustrating the various instructions which are carried out and inquiries which are made by the microprocessor, the flow charts show typical alphanumeric messages which are displayed on display 16. It will be appreciated that these messages serve as prompts in directing the user in the operation of terminal 10 and also provide useful information relating to, for example, incoming messages, operating modes, and the like.

Figure 5A:
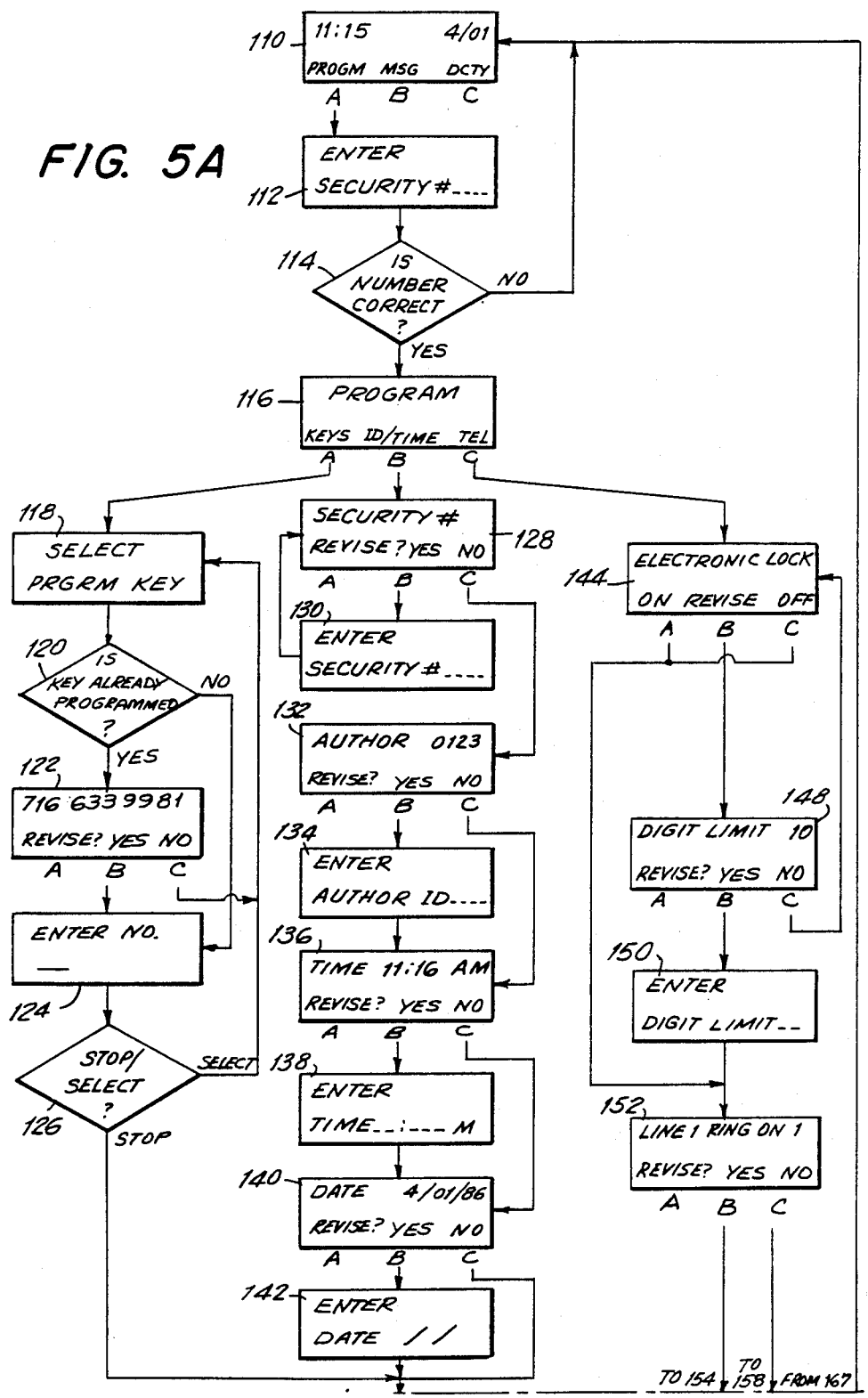
FIGS. 5A and 5B show a flow chart of the manner in which programmable keys are programmed.
Figure 5B:
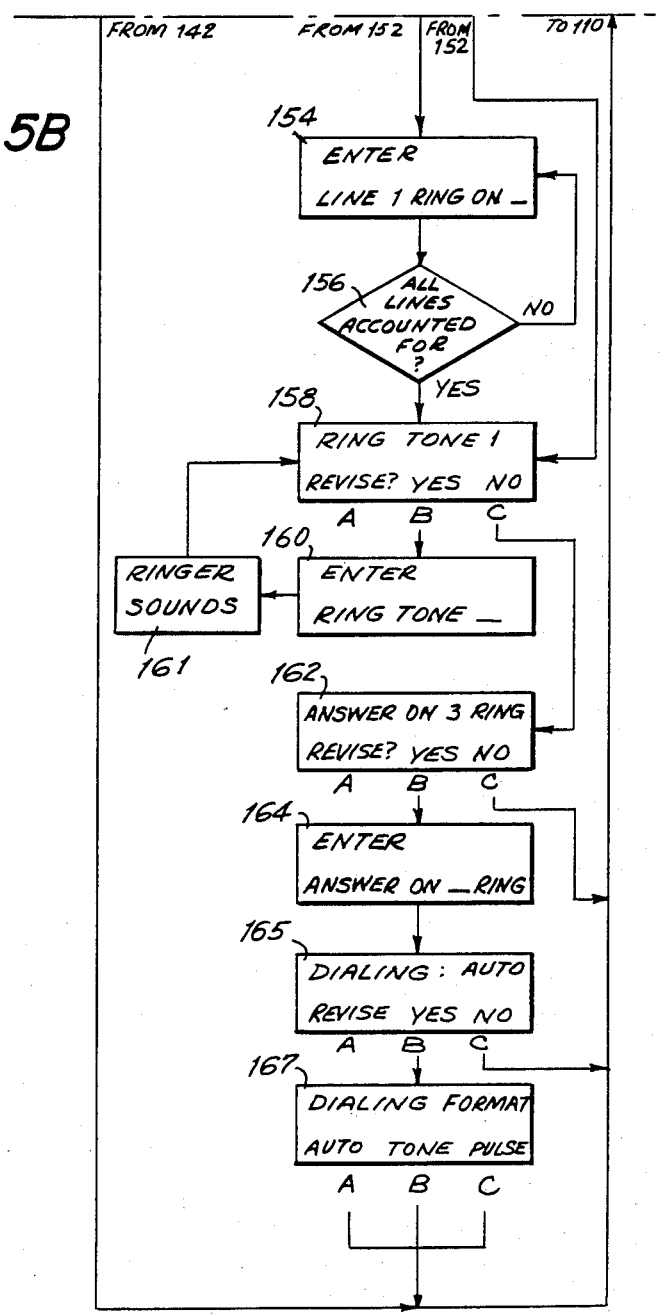

Turning now to FIG. 5, a basic display 110 normally provided on display 16 is illustrated. This display indicates the present time of day and date. In addition, this basic display provides, in alignment with soft keys A, B and C, respective functions which then may be selected by the actuation of respective ones of these soft keys. The basic display permits a user to select a programming mode of operation by actuating shift key A, a telephone message set-up operation by actuating soft key B, and a telephone directory creating operation by actuating soft key C. The telephone directory creating operation is described in copending application Ser. No. 895,001.

It is assumed that, in response to the basic display 110, the user actuates soft key A. As a result, prompt message 112 is displayed, requesting the user to enter his security identification code. This plural digit code number is entered by operating keypad 24; whereupon inquiry 114 is made to determine if the entered security identification number is correct. If this inquiry is answered in the negative, the routine returns to the basic display 110, thus limiting the programming mode to authorized individuals. However, if the user enters an acceptable identification code, prompt message 116 is displayed inviting the user to select for programming either programmable keys 100 or to enter new security and author identification codes and present time and date, or to select various telephone operating features. In response to prompt message 116, let it be assumed that the user actuates soft key A.

Upon actuation of soft key A, display 16 provides prompt message 118 inviting the user to select any one of programmable keys 100 for programming. That is, any one of these programmable keys may be assigned a particular operating function, such as those mentioned above and as will be further described below. After selecting a desired one of the programmable keys, inquiry is made at 120 as to whether this key already has been programmed with an operating function. If this inquiry is answered in the affirmative, display 16 provides the prompt display 122 which displays the function assigned to that key and also invites the user either to revise that function or to retain it. In FIG. 5, the function previously assigned to the selected key is a particular telephone number. Alternatively, various codes may be displayed representing previously assigned functions, such as a code indicating that the key has been programmed to connect terminal 10 directly to a central dictation system, or to select a particular telephone line to which the terminal will be coupled, or to select a telephone message recording mode of operation, or to inhibit the dial-out capabilities of the terminal, or to effect a delay in generating an audible ringing tone, and so on.

If the user does not wish to revise the operating function that has been programmed for the selected key, soft key C is actuated, thus retaining that function, and the routine returns to display prompt message 118. The user then may select another one of the programmable keys for programming.

However, if the selected key has not already been programmed, or if the user wishes to revise the operating function that had been assigned to the selected key, the routine advances to prompt message 124 which invites the user to enter either a telephone number or operating function code that thereafter will be assigned to this key. Since the telephone number and operating function code may be of variable length, when an appropriate number of digits has been entered to identify the telephone number or operating function, the SELECT key is actuated, whereupon the routine returns to prompt message 118, thus permitting the foregoing operation to be repeated, as desired. In this manner, any number of programmable keys may be selected for programming; and appropriate operating functions may be assigned to each selected key.

At any time during this programming operation, the user may wish to terminate the programming mode. For example, after a suitable number of programmable keys have been programmed, this mode can be terminated. The actuation of the STOP key terminates the programming mode, and the routine returns to basic display 110. As shown in FIG. 5, inquiry 126 is made to determine whether the SELECT or the STOP key has been actuated. Alternatively, if an error is made during this programming mode, the user may operate the BACK key to return to the immediately preceding step in this routine, and the user may begin again.

Let it be assumed that, when prompt message 116 is displayed, the user actuates soft key B. As a result, the routine advances to display prompt message 128 which indicates the security identification number now associated with terminal 10 and invites the user to revise that security identification number if he desires. Should the user wish to revise this number, soft key B is actuated, resulting in the display of prompt message 130. The user is invited to enter a new security identification number. In one embodiment, a preset number of digits (e.g. four) may be provided for all security identification numbers, and prompt message 130 remains displayed until four digits have been entered. Thereafter, the routine returns to prompt message 128 and cycles through the illustrated loop until soft key C is actuated to indicate that no further revision to the present security identification number is desired. Prompt message 132 then is displayed. This message 132 indicates the identification of the user of terminal 10, referred to herein as the author identification number. Here too, the user is invited to revise that author identification number if he so desires. If revisions are to be made, the user actuates soft key B, resulting in the display of prompt message 134 which invites the user to enter a new author identification number. Once that new identification number has been entered or, alternatively, if no revisions are to be made to the present author identification number, the routine advances to display prompt message 136.

Prompt message 136 indicates the present time that may be set for terminal 10. The user is invited by this prompt message to revise that time. For example, in the event of a change to or from Daylight Saving Time, or in the event of a change in the location of terminal 10, it may be necessary to correct the actual time that is set in terminal 10. If revisions are to be made, soft key B is actuated, resulting in the display of prompt message 138. This message invites the user to enter the time, in terms of hours and minutes, and also to indicate whether the present time of day is A.M. or P.M. Thereafter, or in the event that no changes in the time set for terminal 10 are to be made, the routine advances to display prompt message 140. This message indicates the present date that is set in terminal 10, and invites the user to revise that date, if necessary. Should a date revision be desired, soft key B is actuated, resulting in the display of prompt message 142. This message invites the user to enter the date, preferably in terms of American notation of month/day/year. Once this date information has been entered or, alternatively, if no revision in the date set for terminal 10 is to be made, the routine returns to basic display 110. Thus, security and author identification numbers, present time and present date may be set for terminal 10.

Let it be assumed that, when prompt message 116 is displayed, the user actuates soft key C for the purpose of selecting certain telephone-related functions to be carried out by terminal 10. In response to the actuation of soft key C, prompt message 144 is displayed. This message invites the user to inhibit the dial-out capabilities of terminal 10, if desired. As illustrated, the user is given the choice of setting an "electronic lock", or dial-out inhibit operation, revising a previous setting or cancelling/negating dial-out inhibition thereby permitting unrestricted dialing by use of keypad 24, the stored number keys or by access to the stored telephone number directory. Let it be assumed that the user wishes to establish (or revise a previously set) dial-out inhibition function. In this regard, soft key B is actuated, resulting in the display of prompt message 148.

Prompt message 148 displays a previously set limitation on the total number of digits that may be included in a telephone number permitted to be dialed by the operation of keypad 24. In FIG. 5, it is assumed that the previous digit limitation was set at 10, thus permitting the operation of keypad 24 to dial virtually any telephone number, including a 3-digit area code and 7-digit calling number. Message 148 invites the user to revise the limitation on the number of digits that may be dialed. If such revision is desired, the user actuates soft key B, resulting in the display of prompt message 150. This message invites the user to enter a one or two digit number representing the total number of digits that may be dialed by keypad 24. For example, it is expected that a limitation that is less than seven digits will limit the calling capability of terminal 10 to intra-office extensions. A digit limitation of seven will inhibit the calling of telephone numbers which require the entry of an area code. In entering the digit limitation, the user must take into account any access codes that may be needed in accordance with the protocol of the telephone network (e.g. PBX requirements) with which terminal 10 is used. After the digit limitation has been entered in response to the invitation presented by prompt message 150, the routine advances to prompt message 152.

Let it be assumed that, in response to the display of prompt message 144, the user elects either to permit unrestricted dialing via terminal 10 or he elects to retain the previously set (or just set) limitations. The actuation of soft key C effectively turns off the dial-out inhibition feature, and the actuation of soft key A retains the present setting for this feature. In either event, the routine advances to display prompt message 152. The telephone feature referenced by prompt message 152 is the delayed ringing feature, mentioned above. This delayed ringing feature is useful in, for example, an environment wherein incoming telephone calls directed to the terminal also may be received on an auxiliary telephone instrument. For example, telephone calls directed to a business executive also may be accessed by his secretary's telephone. If such telephone calls normally are intercepted by the executive's secretary, it is desirable to delay the actual generation of audible ringing tones on the executive's telephone to permit his secretary to intercept that telephone call. If, after a predetermined number of ringing signals the telephone call is not answered, for example, because his secretary is absent, audible ringing tones then are produced on the executive's terminal so he may answer the call.

Prompt message 152 apprises the user of the number of ringing signals which must be received by, for example, ringing signal detector 84 (FIG. 4) before an audible ringing tone is generated, as by ringing tone generator 86. This prompt message also indicates the particular telephone line on which this delayed ringing feature will occur. In the particular message shown as prompt message 152, an audible ringing tone will be generated on the first incoming ringing signal that is received on line 1. The prompt message invites the user to revise this delayed ringing feature or to retain it. If revision is desired, soft key B is actuated, resulting in the display of prompt message 154 which invites the user to enter the number of ringing signals which must be received on telephone line 1 before the audible ringing tone is generated.

After the user enters, by way of keypad 24, the appropriate delay before the audible ringing tone is generated, the routine advances to inquire, at 156, as to whether all telephone lines that are connected to terminal 10 have been accounted for. If the terminal is connected to a single telephone line, this inquiry is, of course, answered in the affirmative. However, if the terminal is connected to plural telephone lines, any one of which may be selected for telephone communication, inquiry 156 is answered in the negative; and prompt message 154 is displayed once again to invite the user to enter a desired delay for telephone calls received on the next sequential telephone line, such as line 2. This process is repeated until the appropriate delays are entered for each telephone line. If no delay is desired, the user merely actuates pushbutton "1" of keypad 24, indicating that the audible ringing tone should be generated on receipt of the first incoming ringing signal.

Once all telephone lines to which terminal 10 have been accounted for with respect to this delayed ringing feature, inquiry 156 is answered in the affirmative; and the routine advances to display prompt message 158.

Prompt message 158 relates to the type of audible tone which may be generated in response to an incoming ringing signal. For example, if five separate tones may be produced by ringing tone generator 86 (FIG. 4), each tone may be identified by a code number (e.g. tone 1, tone 2, tone 3, etc.). Prompt message 158 indicates that tone 1 has been selected for generation when an incoming ringing signal is detected by ringing signal detector 84. This message also invites the user to retain or revise that tone. If a revision is desired, soft key B is actuated; resulting in prompt message 160. This message invites the user to enter the particular code which identifies the desired ringing tone. After a ringing tone has been selected, the routine advances to generate the selected ringing tone, as indicated at 161, and then returns to prompt message 158. The loop formed by 158, 160 and 161 is cycled until soft key C is actuated to indicate no further changes in the selected ringing tone. Then, the routine displays prompt message 162.

Prompt message 162 relates to the number of incoming ringing signals which must be detected before an automatic answering operation is carried out. This automatic answering operation is used during unattended modes of operation of, for example, record/playback module 50 when operating either as a telephone answering machine or as a remote dictating machine, both modes of operation having been described above. Prompt message 162 indicates the delay which had been set previously, and the user is invited to revise or retain that delay. In the illustrated example, terminal 10 responds to the third incoming ringing signal that is detected by detector 84 before actuating record/playback module 50. Should the user wish to revise this delay, prompt message 164 is displayed; and the user is invited to enter the number of ringing signals that should be received before automatic answering is effected. Once this delay is entered, the routine advances to prompt message 165.

Prompt message 165 invites the user to retain or revise the dialing format that was selected previously. As mentioned above, terminal 10 generates dialing signals in the form of tone (i.e. Touch Tone) signals or pulse signals. If the particular telephone network to which the terminal is connected cannot respond to dialing tone signals, then dialing pulses are generated. The selection between tone and pulse signals may be made automatically or manually. If automatic selection is to be effected, this is carried out by initially generating a dialing tone signal and thereafter detecting the presence or absence of dial tone on the telephone line. If the telephone network does not respond to tone signals, dial tone will be present following the generation of the dialing tone signal; and dial out generator 82 (FIG. 4) then changes over and applies dialing pulses to the telephone line in response to microprocessor control.

As illustrated, prompt message 165 displays the previously selected dialing format. If this format (shown as being "auto" selection of tone or pulses) is to be retained, soft key C is actuated and the routine returns to basic display 110. However, if the user wishes to revise the dialing format, soft key B is depressed, resulting in prompt message 167 which invites the user to select the "auto" selection of tone or pulse dialing, the generation of dialing tone signals, or the generation of dialing pulse signals. The user makes his selection by actuating a selected one of soft keys A, B or C; whereupon the selected dialing format is carried out for subsequent dial-out operations. The microprocessor then returns to basic display 110.

From the foregoing, it is seen that selected ones of programmable keys 100 may be assigned with particular operating functions, such as predetermined telephone numbers (display 122) or with other functions represented by numerical codes.

Figure 6A:
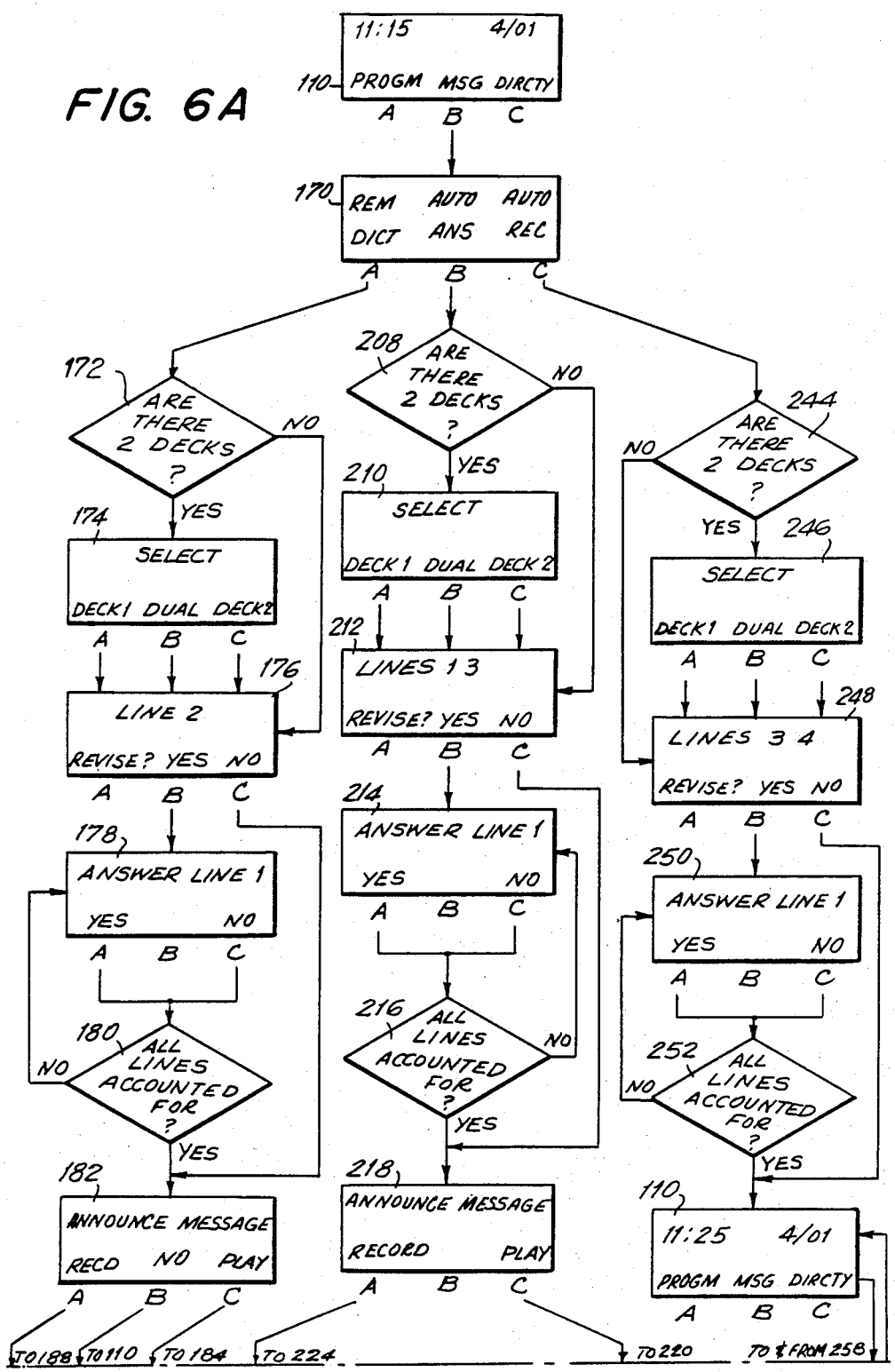
FIGS. 6A, 6B, and 6C shows a flow chart of the manner in which various voice messaging functions are selected and carried out.
Figure 6B:
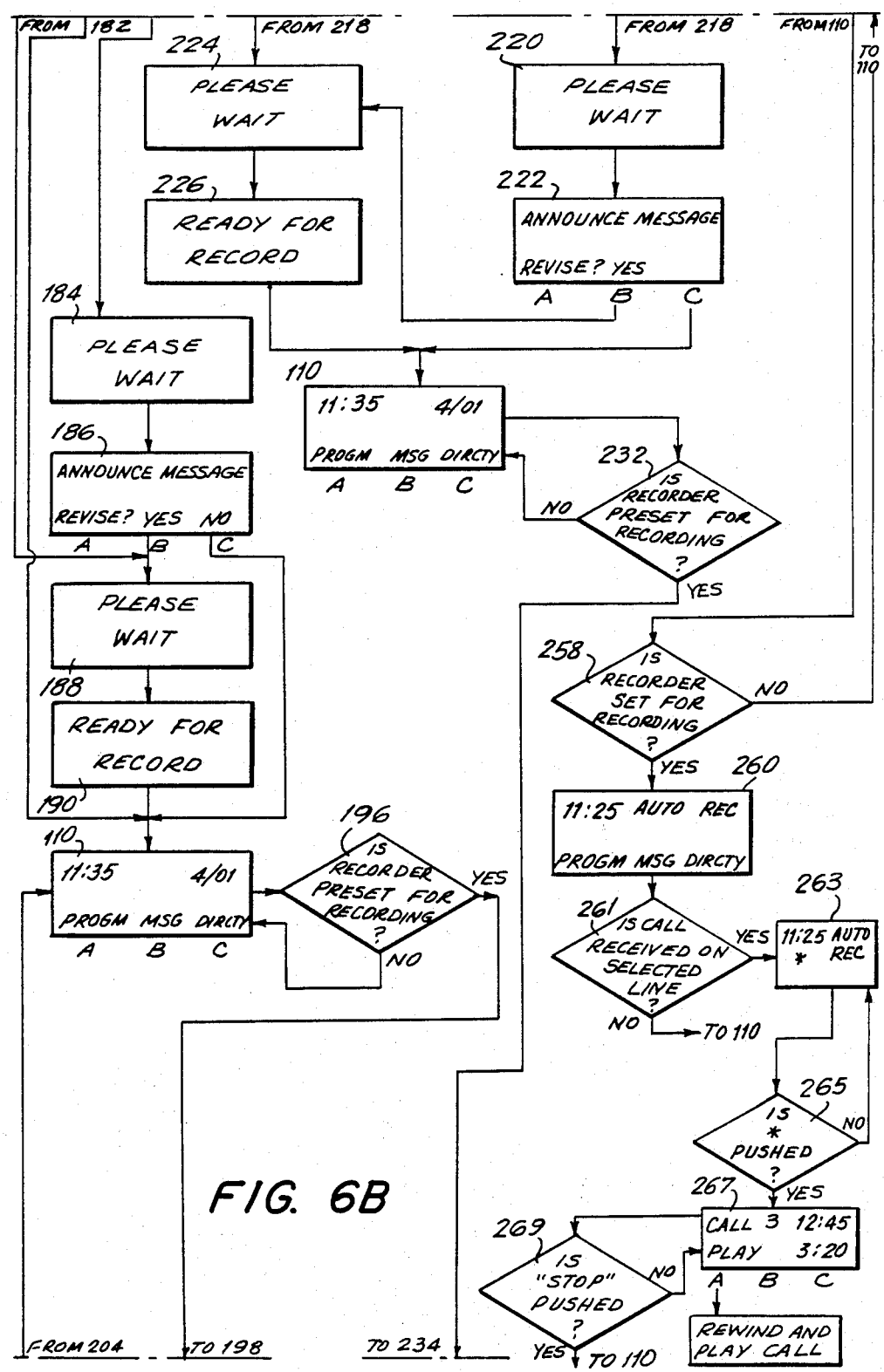
Figure 6C:
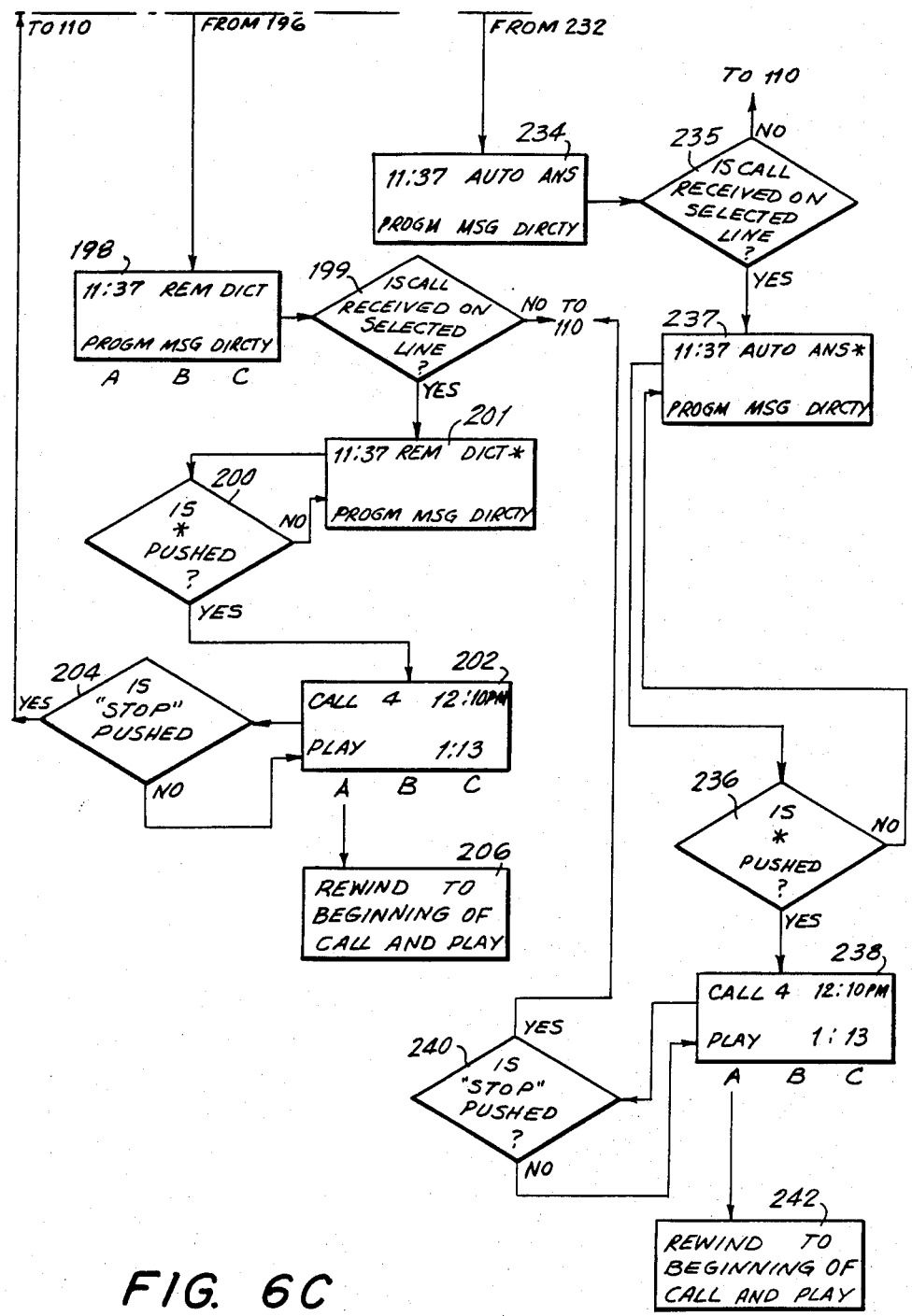

Turning now to FIG. 6, the manner in which terminal 10 is programmed to record incoming messages received over telephone network 90, as during a telephone answering operation, a remote dictation operation or merely to record a telephone conversation, is represented by the illustrated flow chart. It will be appreciated that, once the terminal is programmed in the manner described below, the assignment of the telephone message recording function to a particular programmable key 100 is effected in the manner represented by the flow chart shown in FIG. 5, and particularly blocks 118, 120, 122 and 124, such that, after this assignment, the actuation of the programmed key conditions terminal 10, together with record/playback modules 50 and/or 51, to effect that telephone message recording operation. As an example, when the desired one of programmable keys 100 is selected for assignment thereto of this function, the code used to designate this function may be "#*03" or "#*04". For convenience, this telephone message recording function is referred to simply as "voice messaging". For the embodiment wherein two record/playback modules are connected to telephone/dictation terminal 10, as shown in FIG. 4, the code "#*03" programs the selected programmable key to condition module 50 (for example) for the voice messaging operation and the code "#04" conditions module 51 to operate in the voice messaging mode. For "dual deck" operation (described below), the code "#*04" conditions module 50 to play back an announcement message and module 51 to record an incoming message.

Turning now to FIG. 6, let it be assumed that, after observing basic display 110, the user actuates soft key B for the purpose of programming terminal 10 for the voice messaging mode. The actuation of soft key B results in the display of prompt message 170. This message invites the user to select three alternative voice messaging functions: the remote dictation function, wherein dictation may be recorded from a remote location via telephone lines, a telephone answering operation (referred to as an "auto answer" operation) and an automatic recording operation by which a telephone conversation is recorded. Terminal 10 may be programmed for any one (or two) of these modes merely by operating a desired one of soft keys A, B and C.

Let it be assumed that the user of terminal 10 wishes to condition the terminal for remote dictation. Accordingly, soft key A is actuated, and the microprocessor advances to inquire, at 172, if two record/playback modules are connected to the terminal. If this inquiry is answered in the affirmative, prompt message 174 is displayed, inviting the user to select one of these modules on which remotely dictated messages will be recorded, or to select a "dual deck" operation by which an announcement message that has been recorded on one module (e.g. module 50) is played back in response to an incoming telephone call, and the other module (e.g. module 51) thereafter is turned on to record any incoming message that may be received. Dual deck operation also permits one of the record/playback modules to record incoming telephone messages (in the remote dictation, auto answer and automatic record modes, respectively) while the other record/playback module may be operated concurrently to record "local" dictation (i.e. messages that are dictated directly onto that module via handset 14), or to record telephone messages received over a different telephone line.

After selecting the desired record/playback module for this voice messaging operation, or in the event that only a single record/playback module is connected to terminal 10 (i.e. inquiry 172 is answered in the negative), the microprocessor controls display 16 to display prompt message 176. This message indicates the particular telephone line (or lines) that will be coupled to the record/playback module for remote dictation. Prompt message 176 indicates that telephone line 2 will be coupled to the selected record/playback module such that an incoming telephone call on that line will be answered and the selected record/playback module will be turned on to record remote dictation. Prompt message 176 also invites the user to change this designated telephone line if he so desires. If such a change should be made, the user actuates soft key B, resulting in the display of prompt message 178. This message inquires if the user wishes to connect the selected record/playback module to telephone line 1 for remote dictation purposes. The answer to this inquiry is answered in the affirmative by actuating soft key A or in the negative by actuating soft key C. Irrespective of the particular soft key which is actuated, the microprocessor advances to inquiry 180 to determine if all telephone lines to which module 10 is connected have been accounted for. For example, if telephone interface 76 is connectable to five separate telephone lines, inquiry 180 will be answered in the negative at this time. As a result, prompt message 178 is displayed once again, this time inquiring if the selected record/playback module should be connected to telephone line 2 to carry out the remote dictation operation. Once again, the user indicates his acceptance or rejection of connecting the record/playback module to the indicated telephone line by actuating soft key A or soft key C. It is appreciated that the microprocessor cycles through prompt message 178 and inquiry 180 until all available telephone lines (e.g. all five telephone lines) have been accounted for. At that time, the microprocessor advances to display the prompt message shown at 182.

This prompt message invites the user to record an announcement message, to play back a previously recorded announcement message or to dispense with any announcement message. For the dual deck mode of operation, that is, if the user had actuated soft key B in response to prompt message 174, the announcement message is recorded on one record/playback module and incoming dictation is recorded on the other. For a single deck mode of operation, that is, if the user had actuated soft keys A or C in response to prompt message 174, the announcement message is recorded at a beginning portion of the magnetic tape provided in the record/playback module and incoming dictation is recorded on the remainder of that tape. Let it be assumed that the user wishes to review the previously recorded announcement message. Consequently, soft key C is actuated in response to prompt message 182. The microprocessor then controls display 16 to display the prompt message 184 while the magnetic tape on which the announcement message had been recorded previously is rewound (if necessary) and then played back. That is, microprocessor 70 controls recorder interface 74 to rewind the magnetic tape in the appropriate one of record/playback modules 50 and 51; and when the beginning of the previously recorded announcement message is reached (e.g. when the beginning of tape is reached), that module is changed over to its playback mode. Alternatively, the magnetic tape may merely be rewound and then, in response to the actuation of, for example, the PLAY key on the record/playback module (FIG. 3), the announcement message is played back.

After playback of the announcement message, the microprocessor controls display 16 to display prompt message 186. This prompt message invites the user to revise the previously recorded announcement message or to retain it. If the user is satisfied with that announcement message, he need merely actuate soft key C, whereupon the microprocessor returns to basic display 110. However, if revisions are desired, the user actuates soft key B, whereupon prompt message 188 is displayed. At this time, the magnetic tape upon which the announcement message had been recorded is rewound once again; and when the beginning of that announcement message is reached, the module is conditioned for a recording operation. Display 16 now displays prompt message 190 to apprise the user that the record/playback module is ready to have a new announcement message recorded thereon. After the announcement message has been recorded, the microprocessor returns to basic display 110.

From the flow chart shown in FIG. 6, it is appreciated that if the user actuates soft key C in response to prompt message 186, thus indicating he wishes to retain the previously recorded announce message, the record/playback module in which that announcement message is recorded is not conditioned for a re-recording operation.

If, in response to prompt message 182, the user wishes to record a new announcement message without reviewing the previously recorded announcement message, soft key A is actuated, resulting in the display of prompt message 188. Thereafter, the microprocessor carries out the announcement recording operation which has been discussed above.

In the event that no announcement message is to be recorded, it is expected that the user will actuate soft key B in response to prompt message 182, whereupon the microprocessor advances to basic display 110. It is appreciated that a typical announcement message is intended to apprise an individual who places a telephone call on the telephone line which has been selected for use in the remote dictation mode that he has been connected to a dictating machine and that he should proceed with dictation. Such an announcement message may be unnecessary, especially when it is expected that only the user of terminal 10 will place telephone calls on that telephone line. In that event, the user may prefer not to record such an announcement message.

After the remote dictation features represented by blocks 172-190 in FIG. 6 have been programmed, telephone/dictation terminal 10 may be conditioned to carry out a remote dictation operation upon the actuation of the particular one of programmable keys 100 to which this function has been assigned in the manner described above in conjunction with FIG. 5. Let it be assumed that this particular programmable key has been actuated. Accordingly, and as shown in FIG. 6, the microprocessor periodically inquires whether the record/playback module which has been selected to record remote dictation has been preset to the recording mode. If not, remote dictation is inhibited; and the microprocessor cycles periodically through this inquiry 196. For example, if the selected record/playback module is in the process of recording local dictation, or if that module is being used for a playback operation, or if the TELEPHONE pushbutton (FIG. 3) has not been actuated, inquiry 196 will be answered in the negative. Assuming, however, that the record/playback module has been preset for a remote dictation operation, inquiry 196 is answered in the affirmative and display 198 is provided, indicating that the module is conditioned to record remote dictation on the selected record/playback module. The microprocessor periodically inquires, at 199, if a telephone call is in the process of being received on the telephone line selected for remote dictation. In response to each incoming telephone call, ringing signal detector 84 provides a signal to microprocessor 70 indicating the receipt of an incoming ringing signal on the selected telephone line. The microprocessor then controls telephone interface 76 to "answer" that incoming telephone call and, additionally, the microprocessor controls recorder interface 74 to turn on the appropriate one of record/playback modules 50 and 51 to play back the previously recorded announcement message over telephone network 90 to the calling party. At the conclusion of this announcement message, microprocessor 70 controls recorder interface 74 either to turn on the other record/playback module to record the expected incoming message, or to change over the operation of the record/playback module from which the announcement message had been played back such that this module now may record the expected incoming message. Upon receipt and recording of this incoming message, the microprocessor generates message data representing the sequential number of this message, its length and the time at which it is recorded. This message data is stored, inquiry 199 is answered in the affirmative, and microprocessor 70 then controls display 16 to display prompt message 201. This message indicates the present time of day, the fact that terminal 10 and the record/playback module connected thereto have been programmed for a remote dictation operation, and that a remotely dictated message has been recorded (as indicated by the display of *).

It will be recognized that each time telephone interface 76 detects an incoming telephone call on the telephone line selected for remote dictation, the foregoing operation is repeated; and the message shown at 201 is displayed. Furthermore, as each such incoming message is recorded, the aforementioned message data is generated and stored.

As shown in FIG. 6, after the message shown at 201 is displayed, the microprocessor periodically inquires, at 200, if the * pushbutton on keypad 24 has been actuated. If this inquiry is answered in the negative, the microprocessor periodically cycles through this inquiry. However, if the user actuates this * pushbutton, thus indicating an attempt to retrieve the recorded message, inquiry 200 is answered in the affirmative, and the microprocessor controls display 16 to display prompt message 202. This message displays the stored message data, i.e. the number of the particular message which last was recorded, the time at which that message was recorded and the length of that message. In addition, the prompt message invites the user to retrieve, or "play", this message. From prompt display 202, it is seen that the user is invited to play back message No. 4. Preferably, however, message No. 4 is not retrieved and played back until soft key A is actuated. Should the user wish to retrieve an incoming message that was recorded earlier, he need merely actuate the * pushbutton once again, whereupon prompt message 202 will invite him to play call No. 3. By successive actuation of the * pushbutton, the user may scroll through message data relating to previously recorded incoming messages until a desired one of those messages has been reached. At that time, he need merely actuate soft key A, whereupon microprocessor 70 controls recorder interface 74 to rewind the magnetic tape until the indicated message is reached. At that time, the record/playback module is changed over from its rewind mode to its playback mode; and the selected message is played back, as indicated at 206. At any time during this message retrieval operation, that is, from the time that the * pushbutton is actuated to the time that a desired message is retrieved, the user may actuate the STOP pushbutton on keyboard 28 (FIG. 2), whereupon the present operation of terminal 10 and the record/playback module terminates and the microprocessor returns to basic display 110.

The foregoing has described the manner in which the remote dictation operation of the voice messaging mode has been programmed and utilized. The following explains the manner in which the auto answering mode is programmed. Let it be assumed that, in response to prompt message 170, soft key B is actuated. As during the remote dictation programming mode, inquiry is made as to whether two record/playback modules are connected to telephone/dictation terminal 10. If this inquiry is answered in the affirmative, the user is invited to select one or the other of these modules for automatic answering; or he may select a dual deck arrangement wherein one module is utilized to play back a prerecorded announcement message and the other module is utilized to record an incoming telephone message.

After soft key A or B or C is actuated following the display of prompt message 210, prompt message 212 is displayed. This message indicates those telephone lines which have been selected for use in the auto answering operation; and the user is invited to retain or change those telephone lines on which incoming telephone messages will be recorded. If a change in the selected telephone lines is desired, soft key B is actuated, resulting in the prompt message shown at 214. This message invites the user to select telephone line 1 in the auto answering mode; and after the user accepts or rejects this telephone line, the microprocessor cycles through inquiry 216 to repeat the telephone line selection operation. In this manner, one or more telephone lines may be selected for coupling to the record/playback module(s) such that incoming telephone calls on any of these selected lines are recorded in the telephone answering mode of operation.

After the user has selected those telephone lines to be coupled to the record/playback module for use in the auto answering operation, the microprocessor advances to cause the display of prompt message 218. It is recalled, from prompt messages 182, 184, 186, 188 and 190, that an announcement message may be played back and modified, as desired. This announcement message playback/recording operation is represented by prompt messages 220, 222, 224 and 226; and in the interest of brevity, duplicative description of such prompt messages is omitted.

After an announcement message has been recorded or retained, the microprocessor advances to basic display 110. Upon the actuation of a programmed one of programmable keys 100, terminal 10 together with record/playback module 50 (and/or 51) are conditioned for an auto answering mode of operation. Of course, if none of the programmable keys has been programmed for a voice messaging function, such auto answering operation will not be carried out.

Assuming that the auto answering mode has been programmed, as discussed above, and further assuming that the appropriate one of programmable keys 100 has been assigned with the voice messaging operation, microprocessor 70 now awaits an incoming telephone call on the telephone lines which had been selected for use with the auto answering function. Inquiry 232 is made periodically to determine if the record/playback module has been preset for recording. It is appreciated that inquiry 232 is similar to aforedescribed inquiry 196. If inquiry 232 is answered in the negative, the microprocessor merely controls display 16 to provide the basic display 110. However, if inquiry 232 is answered in the affirmative, message 234 is displayed, thereby indicating that terminal 10 together with the record/playback module connected thereto is operating in the auto answering mode. As described previously in conjunction with the remote dictation operation, the microprocessor periodically inquires, at 235, if a telephone call is being received on the telephone line(s) selected for auto answering. When this inquiry is answered in the affirmative, a telephone answering operation is carried out and message 237 is displayed. The indication "*" apprises the user that an incoming message has been recorded. A recorded message may be retrieved and played back by actuating the * key of keypad 24. Inquiry 236 senses when this key is actuated, resulting in the display of prompt message 238. Message 238 provides the message data which indicates the number of the last incoming telephone message that was recorded, its time of recording and its length. This prompt message also invites the user to retrieve the recorded message by operating soft key A. Similar to the message scrolling operation discussed above, the user may scroll backward through stored message data by successively actuating the * key, whereupon the number of each previously recorded message is displayed, together with its time of recording and its length. When a desired one of these messages is displayed, the actuation of soft key A serves to control recorder interface 74 to supply a suitable command signal to the record/playback module to rewind the magnetic tape therein to the beginning of the selected message and then to play back that message, as indicated at 242. If, at any time while scrolling through the display of recorded messages, or while retrieving a desired message the STOP pushbutton on keyboard 28 is actuated, the scrolling or retrieving operation terminates and the microprocessor returns to basic display 110. Inquiry 240 is made periodically to sense the actuation of this STOP pushbutton.

Thus, it is seen that the auto answering mode of operation may be programmed in a manner quite similar to the programming of the remote dictation operation; and this mode may be initiated and carried out by the actuation of a suitably preprogrammed one of programmable keys 100.

Now, let it be assumed that the user wishes to effect the auto record mode of the voice messaging function. This is attained by actuating soft key C in response to prompt message 170. Thereafter, the microprocessor advances through inquiry 244, prompt messages 246, 248 and 250 and inquiry 252, these being similar to inquiry 208, prompt messages 210, 212 and 214 and inquiry 216 which, in turn, are similar to inquiry 172, prompt messages 174, 176 and 178 and inquiry 180. Since these have been discussed in detail above, further description thereof is not provided. Suffice it to say that these inquiries and prompt messages, taken in conjunction with the selective actuation of soft keys A, B and C, select an appropriate record/playback module upon which a telephone conversation may be recorded, and also select one or more telephone lines which will be coupled to the selected record/playback module such that a telephone conversation on the selected line is recorded.

Once the telephone lines have been selected, inquiry 252 is answered in the affirmative, and the microprocessor returns to basic display 110, awaiting an incoming telephone call. Terminal 10 now is conditioned to respond to an incoming telephone call over any of the selected lines, as sensed by telephone interface 76, to couple the record/playback module to that line, thereby permitting the recording of the telephone conversation which takes place on that line. Microprocessor 70 periodically inquires, at 258, if the record/playback module is in condition for recording the telephone conversation. Typically, this inquiry is answered in the affirmative if the TELEPHONE pushbutton on the record/playback module is actuated. If not, the incoming telephone call is not recorded; and microprocessor 70 merely controls display 16 to provide the basic display 110. However, if the record/playback module is in condition for telephone recording, inquiry 258 is answered in the affirmative and microprocessor 70 controls display 16 to display message 260. This message apprises the user of the fact that terminal 10 in conjunction with the record/playback module connected thereto is disposed in the automatic recording mode of the voice messaging function. Microprocessor 70 periodically inquires, at 261, if an incoming telephone call is present on the telephone line selected for automatic recording. When this inquiry is answered in the affirmative, the record/playback module which had been selected to record telephone conversations is turned on, the telephone conversation is recorded, and message 263 is displayed. It now is appreciated that the "*" indicates the recording of a telephone conversation.

The routine periodically inquires if the * key is actuated and, if so, prompt message 267, inviting the user to play back the recorded conversation, is displayed. By actuating soft key A, the selected conversation is played back in the same manner as discussed above. If the STOP pushbutton on keyboard 28 is actuated, the present operation of terminal 10 terminates and the microprocessor returns to basic display 110. Inquiry 269 periodically ascertains whether this STOP pushbutton has been actuated.

Thus, when the voice messaging function is assigned to a desired one of programmable keys 100, the selected one (or ones) of the voice messaging operations will be carried out independently of each other, but dependent upon whether the particular telephone line on which an incoming telephone call is made has been selected for remote dictation, auto answering or automatic recording. It is appreciated that, if desired, one (or more) telephone line may be selected for use with, for example, record/playback module 50 for one of the voice messaging functions; and another one (or more) of the telephone lines may be coupled to record/playback module 51 for a different one of the voice messaging functions. Hence, remote dictation my be recorded on one module while automatic answering may be effected with the other. Of course, a simple, single actuation of a preprogrammed one of programmable keys 100 is all that is needed to condition terminal 10 and the record/playback modules connected thereto for voice messaging. Furthermore, the use of prompt messages and soft keys A, B and C facilitates a relatively simple programming operation to select remote dictation, auto answering or automatic recording.

The flow chart of FIG. 5 describes the manner in which programmable keys 100 are selectively programmed to initiate desired operating functions; and this flow chart also describes the manner in which telephone-related functions may be programmed (e.g. dial-out inhibiting, ringing signal delay, ringing tone selection, and the like).

The flow chart of FIG. 6 describes the manner in which various voice messaging functions may be selected and carried out. Reference now is made to the flow chart of FIG. 7 which describes the manner in which the telephone/dictation terminal operates, assuming that the various programmable keys have been assigned with desired operating functions. Commencing with the basic display 110, terminal 10 awaits the actuation of keypad 24, keyboard 28, programmable keys 100 or the removal of handset 14 from cradle 18 to dispose the terminal in its off-hook mode. From basic display 110, the microprocessor inquires, at 272, if the telephone/dictation terminal is in its off-hook mode. If this inquiry is answered in the affirmative, the telephone line is seized, at 271, and inquiry 273 is made to determine if the program key assigned with the central dictation function is actuated. If central dictation is not selected, display 274 is provided. Anticipating the initiation of a telephone call, display 274 indicates the present time and the duration of the telephone call. Since a telephone call has no yet been initiated, the duration here is indicated as 00:00.

Display 274 is maintained until further action is taken. Inquiry 276 determines if the DIAL pushbutton of keypad 24 has been actuated. If inquiry 276 is answered in the affirmative, the last telephone number which had been dialed by terminal 10 is displayed on display 16, as represented by instruction 278. Inquiry then is made, at 280, to determine if the BACK key, included in keyboard 28, is actuated. If so, the telephone number which preceded the last-dialed number is displayed. It is appreciated that, by successive actuation of the BACK key, the user may scroll through a history (e.g. 5) of previously dialed telephone numbers, in reverse chronological order.

If the BACK key is not actuated, inquiry then is made, at 282, to determine if the DIAL pushbutton is actuated once again. If not, the microprocessor merely controls display 16 to display either the last-dialed telephone number or the telephone number which has been reached in response to the actuation of the BACK key. However, if the DIAL key is actuated once again, that is, if inquiry 282 is answered in the affirmative, the displayed telephone number is retained on display 16, that telephone number is dialed automatically (as by dial-out generator 82) on the previously seized telephone line, and timing of the duration of the telephone call is commenced. Thus, it is seen that a simple, single actuation of the DIAL key results in the display of the previously dialed telephone number, and the reactuation of that key initiates the automatic dialing of the displayed telephone number. Of course, microprocessor 70 controls dial-out generator 82 to generate the dialing signals needed to effect dialing of the displayed telephone number.

After the displayed telephone number is dialed, inquiry is made at 286 to ascertain if that called number is "busy". If so, prompt message 288 is displayed. This message indicates the programmed number of times that terminal 10 will re-dial a called but busy telephone number, and invites the user to retain that programmed number, revise it or terminate the re-dial operation, depending upon whether soft key A, B or C is actuated. The actuation of a soft key is sensed by inquiry 289. If a soft key is operated, this inquiry is answered in the affirmative, and the operations which follow such soft key actuation are carried out, as will be described. However, if a soft key is not actuated, as when a redial operation should not be executed, inquiry 289 is answered in the negative and executed, inquiry 291 next is made to determine if a predetermined time duration (initiated with this inquiry) has timed out. Prompt message 288 is retained until the conclusion of the time out period or if, prior to such time out, soft key A, B or C is actuated. If inquiry 291 is answered in the affirmative, the microprocessor returns to display prompt message 274. If the re-dial operation is to be terminated, soft key C is actuated; and the microprocessor advances to inquiry 304 to determine if terminal 10 has hung up. If so, the telephone line is released and basic display 110 is resumed.

If the programmed number of re-dial operations is to be revised, soft key B is actuated, resulting in the prompt message 290 which invites the user to enter, by operation of keypad 24, the number of re-dial attempts that should be made. Prompt message 290 remains displayed until inquiry 292 has been answered in the affirmative that a number has been entered in response to prompt message 290. At that time, message 294, indicating that a re-dial operation is in progress, is displayed.

Figure 7A:
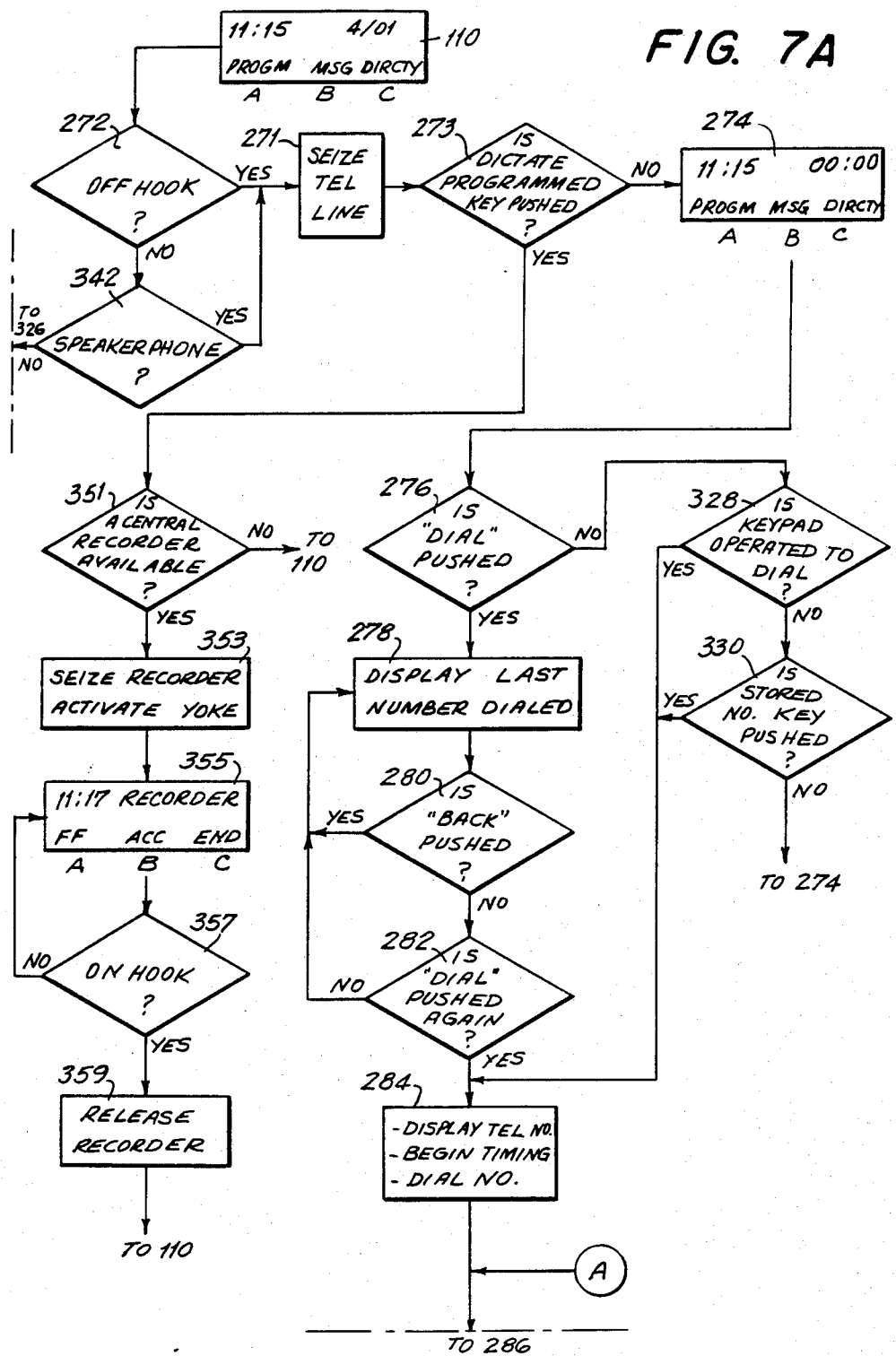
FIGS. 7A, 7B, and 7C show a flow chart of the operation of the telephone/dictation terminal of the subject invention.
Figure 7B:
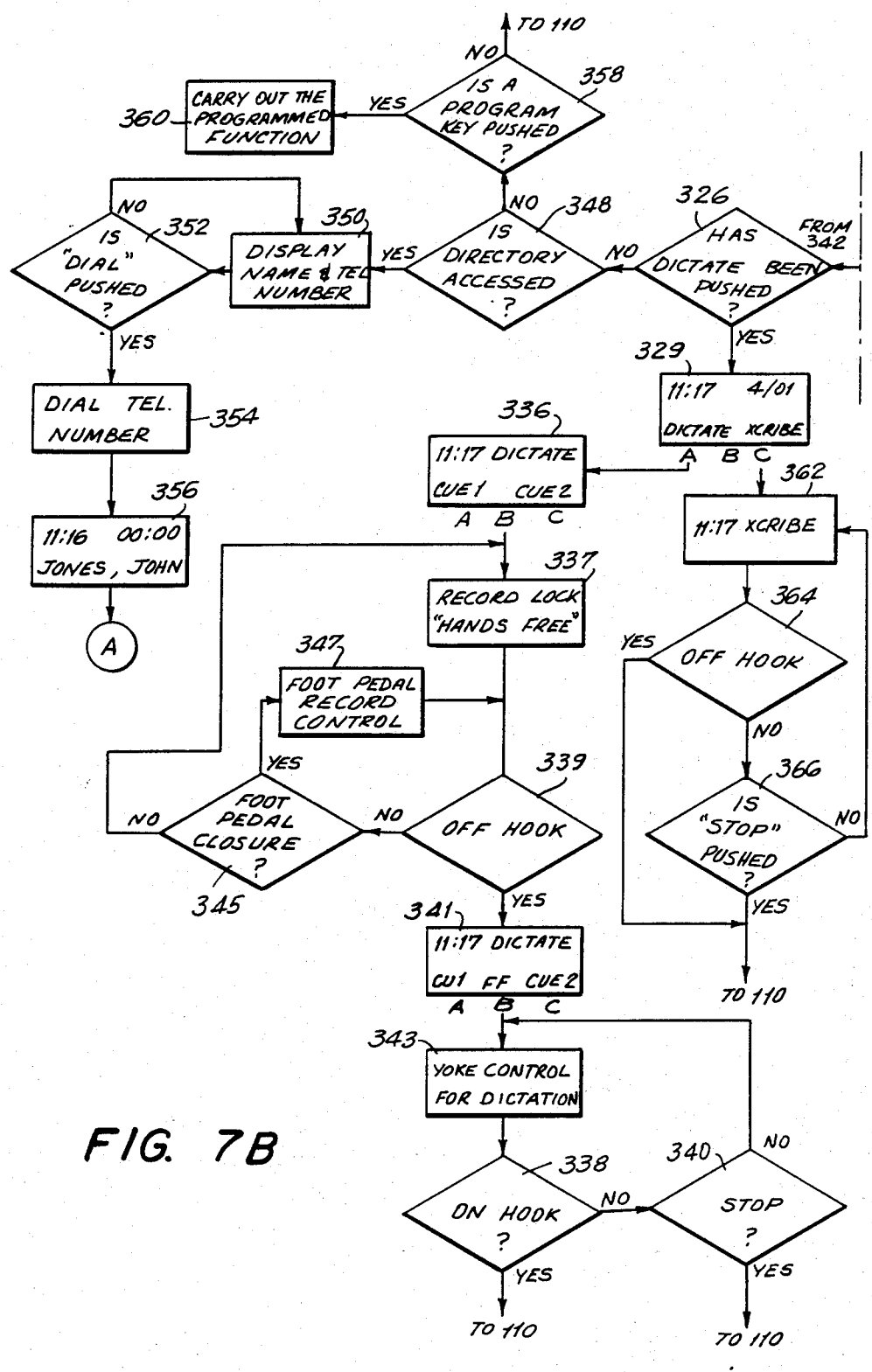
Figure 7C:
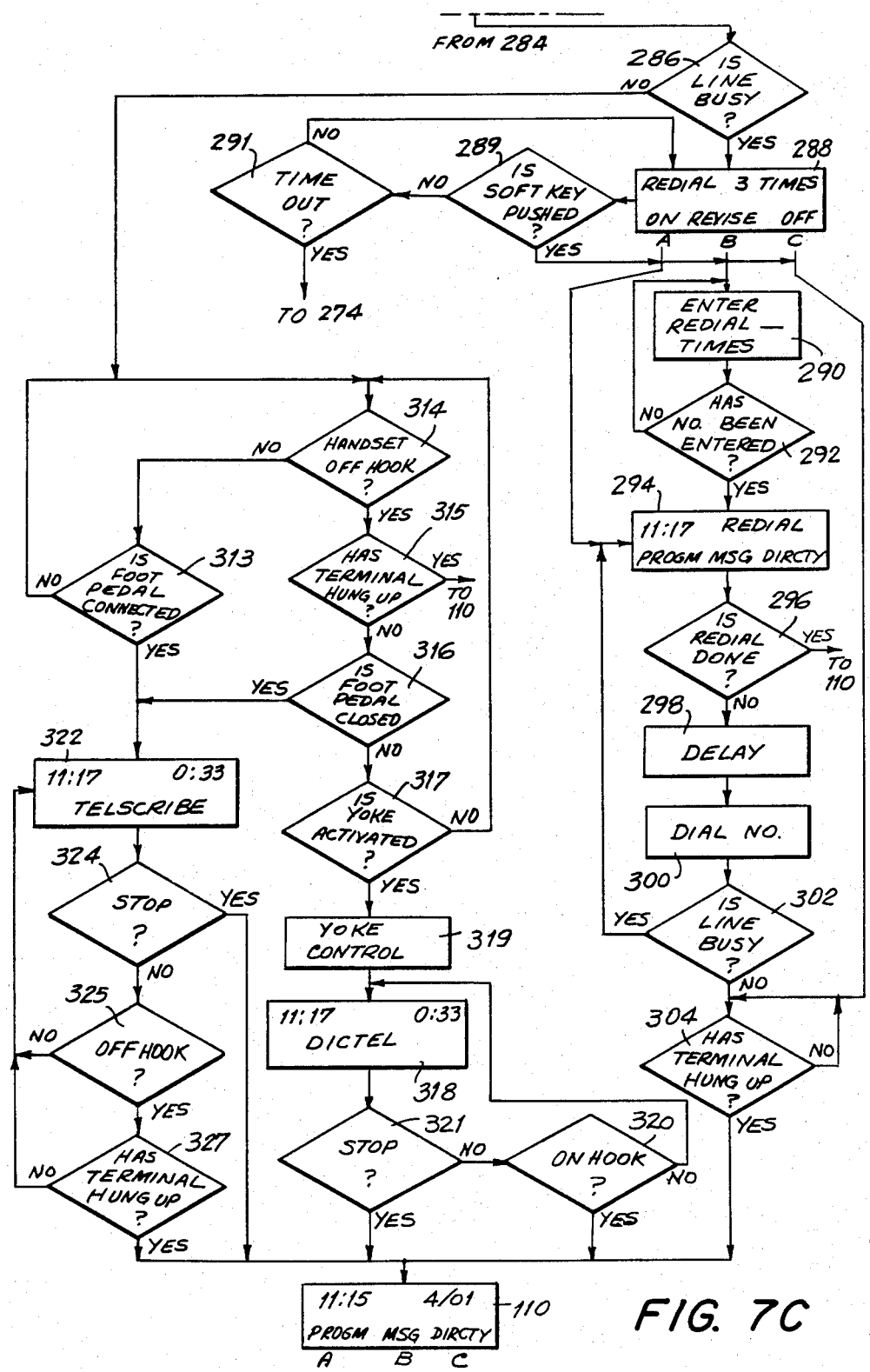

It is seen from the flow chart of FIG. 7 that if the programmed number of re-dial attempts is retained, as by the actuation of soft key A, display 294 is provided. Following this display, the routine carried out by microprocessor 70 advances to inquire, at 296, if the redial operation has terminated. This inquiry is answered in the affirmative after the programmed number of re-dial attempts has been made. Assuming inquiry 296 is answered in the negative, a delay 298 is established before the dialed, but busy, telephone number is redialed, as represented at 300. As a numerical example, a one-minute delay may be imparted before the telephone number is re-dialed.

After re-dialing the telephone number, as represented by instruction 300, inquiry 302 determines whether the called telephone number is busy. If this inquiry is answered in the affirmative, the routine returns to display 294, and the aforementioned re-dial operation is repeated. Thus, if the dialed telephone number is busy, that number is re-dialed at one minute intervals, for example, until the programmed number of re-dial attempts has been made or, prior to making that programmed number of attempts, the called telephone number is answered.

If the re-dialed telephone number is answered, inquiry 302 is answered in the negative, and inquiry 304 determines if terminal 10 has hung up. If this inquiry is answered in the negative, it is assumed that a telephone conversation is in progress; and the microprocessor recycles through inquiry 304 periodically. Eventually, terminal 10 hangs up, inquiry 304 is answered in the affirmative, and the microprocessor returns to basic display 110.

The foregoing operation has assumed that the telephone number which was dialed initially was busy. If the dialed telephone number is answered, inquiry 286 is answered in the negative; and the routine carried out by the microprocessor advances to inquire, at 314, if the handset is off-hook. If this inquiry is answered in the negative, it is possible that terminal 10 is to be used to transcribe messages that had been recorded at the particular station which has just been called. Accordingly, the microprocessor inquires, at 313, if foot pedal switches are connected to the terminal. If not, the loop formed of inquiries 313 and 314 is periodically cycled. However, if handset 14 is on-hook and foot pedal switches (or equivalent) are connected to terminal 10, display 322 is provided indicating that the terminal may be coupled to a remote recorder and is adapted to be operated so as to transcribe messages. The indication "TELSCRIBE", included in display 322, means that terminal 10 may be operated as a telephone-connected transcribe station of the type described in U.S. application Ser. No. 495,756.

However, if handset 14 is in its off-hook condition, inquiry 314 is answered in the affirmative, and inquiry 315 is made to determine if terminal 10 has hung up. If so, the basic display 110 is displayed; but, if not, inquiry 316 is made to determine if a switch closure occurs in a foot pedal switching arrangement that may be attached to the terminal. If this inquiry is answered in the negative, inquiry 317 is made to determine if yoke 20 on handset 14 is activated to control a dictation operation. If yoke 20 is not activated, the routine returns to inquiry 314. However, if inquiry 317 is answered in the affirmative, yoke-controlled dictation is carried out, as indicated at 319, and display 318 is provided. At this stage, it is appreciated that terminal 10 is disposed in its off-hook mode, a foot pedal is not operated (or is not attached thereto), and yoke 20 has been operated. Consequently, it is assumed that the user has operated terminal 10 to place a telephone call to a remotely disposed recorder, and dictation now may proceed from terminal 10 to that recorder as described in copending application Ser. No. 495,756. The indication "DICTEL" included in display 318 represents a type of terminal that may be used to record dictation over telephone lines. A dictation operation then may proceed by operating dictate control yoke 20 and dictate control button 22.

Periodically, the microprocessor inquires, at 321, if the STOP pushbutton is operated. If so, the present operation of terminal 10 terminates and basic display 110 is displayed. If not, however, the microprocessor inquires at 320 if handset 14 has been returned to its on-hook condition. If not, display 318 is retained. However, upon detecting the on-hook condition, the microprocessor returns to basic display 110.

If a foot pedal is connected to terminal 10 and, after dialing a telephone number is actuated, then, and as mentioned above, display 322 is provided. This display, as well as display 318, indicates the present time of day and the duration of the telephone call that had been placed to the remote recorder. During a transcribe operation, as when terminal 10 operates as a "TELSCRIBE" device, handset 14 may be returned to cradle 18 without interfering with transcription. Periodically, inquiry 324 is made to determine if the STOP button on keyboard 28 is actuated. If not, inquiry 325 is made to determine if handset 14 has been removed from the cradle. If it has, inquiry 327 is made to ascertain if terminal 10 has hung up. Display 322 is retained if the handset is not in its off-hook state or if the terminal has not hung up. However, if inquiry 327 is answered in the affirmative, the microprocessor advances to basic display 110.

The foregoing operation has assumed that terminal 10 was disposed in its off-hook condition and that the DIAL button of keypad 24 was actuated. That is, it was assumed that inquiry 272 was answered in the affirmative, inquiry 273 was answered in the negative, and inquiry 276 was answered in the affirmative. If, however, the DIAL button had not been pushed, the routine carried out by the microprocessor advances to inquiry 328 to ascertain if keypad 24 is in the process of being operated for the purpose of dialing a telephone number. If this inquiry is answered in the affirmative, the dialed telephone number is displayed, the number is dialed and the duration of the telephone call is measured, all as indicated at 284. However, if inquiry 328 is answered in the negative, that is, if the user does not operate keypad 24 for the purpose of dialing a telephone number, inquiry 330 is made to ascertain if a stored number key is actuated. If this inquiry is answered in the affirmative, the routine advances to instruction 284. Hence, the displayed telephone number associated with that stored number key is dialed.

If inquiries 276, 328 and 330 all are answered in the negative, the microprocessor returns to display 274. The user thus is apprised that, although terminal 10 is in its off-hook condition, a telephone-related function has not been selected. Rather, terminal 10 merely is "idle".

Let it be assumed that terminal 10 is not disposed in its off-hook condition, whereupon inquiry 272 is answered in the negative. Let it also be assumed that the SPEAKER/MUTE switch has not been operated, such that the "speakerphone" mode of operation is not selected. The illustrated routine advances from inquiry 272 to inquiry 342 and thence to inquiry 326 which ascertains if the DICTATE button included in keypad 24 is actuated. If this inquiry is answered in the affirmative, prompt message 329 is displayed. This message invites the user to select a dictate mode of operation, by actuating soft key A, for recording messages via handset 14 onto the record/playback module connected to the terminal, or a transcribe mode of operation, by selecting soft key C, for transcribing messages from that module. Assuming the actuation of soft key C, display 362 is provided, indicating a TRANSCRIBE operation. Transcription now may be carried out by use of a foot pedal switching arrangement coupled to terminal 10 and, preferably, a conventional transducer head set. Inquiry is made periodically at 364 to determine if terminal 10 has been changed over to its off-hook condition. If so, the microprocessor returns to basic display 110. However, if inquiry 364 is answered in the negative, the routine advances to inquiry 366 to determine if the STOP pushbutton included in keyboard 28 is actuated. The microprocessor cycles through display 362 and inquiries 364 and 366 until either an off-hook condition is established or the STOP pushbutton is actuated.

If the user actuated soft key A in response to prompt message 329, display 336 is provided, indicating a DICTATE operation, and enabling the user to operate soft keys A or C to record cue signals of the type described more particularly in copending application Ser. No. 895,944. A dictate mode of operation may proceed and a "hands free" dictation operation may be carried out using the built-in microphone of the speakerphone circuitry of terminal 10. Then, inquiry 339 is made to ascertain if handset 14 still is on-hook. If so, this inquiry is answered in the negative and inquiry 345 is made to determine if a foot pedal switch closure has occurred. It will be appreciated that the foot pedal arrangement may be used with terminal 10 to control tape movement in the record/playback module to effect this "hands free" dictation operation. If inquiry 345 is answered in the negative, the microprocessor returns to instruction 337 by which the "hands free" dictation operation may be carried out. If inquiry 345 is answered in the affirmative, tape movement is commanded, as at 347, in accordance with the particular switch (e.g. forward, rewind, stop) that has been closed, whereafter inquiry 339 is repeated.

Let it now be assumed that hand set 14 is removed from cradle 18. Inquiry 339 is answered in the affirmative and the "hands free" dictation operation is terminated. Display 341 is provided and soft keys A, B or C may be operated to record cue signals, as mentioned above, or to command a fast-forward movement of the recording tape. Operation of yoke 20 on handset 14, as represented by instruction 343, controls the dictation operation on the record/playback module connected to terminal 10. Periodically inquiry 338 is made to determine if the terminal has been returned to its on-hook condition. If so, the microprocessor advances to basic display 110. However, if the terminal remains in its off-hook condition, the microprocessor advances to inquiry 340 to determine if the STOP pushbutton included on keyboard 28 has been actuated. If this inquiry is answered in the negative, the dictate operation continues; and message 341 is retained. However, if the STOP button is actuated, inquiry 340 is answered in the affirmative and the microprocessor returns to basic display 110.

Let it be assumed that terminal 10 is disposed in its on-hook mode. Inquiry 272 thus is answered in the negative; and the microprocessor advances to inquiry 342 to determine if a speakerphone mode of operation has been selected. More particularly, microprocessor 70 senses whether the SPEAKER/MUTE key included in keyboard 28 is actuated. If this inquiry is answered in the affirmative, terminal 10 may be operated in substantially the same manner as if handset 14 is removed from cradle 18. As shown, if the programmed key assigned with the central dictation function is not actuated, display 274 is provided. A telephone call then may be initiated while operating terminal 10 as a speakerphone; and if a telephone call is placed to a remote recorder, terminal 10 may be operated as a transcribe device, as discussed above.

However, if terminal 10 is not disposed in its off-hook condition and the speakerphone mode of operation has not been selected, the routine carried out by microprocessor 70 advances to inquiry 326 to determine if the DICTATE pushbutton is actuated, as described above. Let it be assumed that this inquiry now is answered in the negative. Accordingly, the microprocessor advances to inquire, at 348, if the telephone number directory included within terminal 10 has been accessed. As described in copending application Ser. No. 895,001, desired telephone numbers may be stored in a suitable memory included in terminal 10. Telephone number data may be generated by actuating keypad 24 or by "downloading" recorded telephone number information from a magnetic tape played back by the record/playback module connected to terminal 10. Such stored telephone directory data may be accessed when terminal 10 is disposed in its on-hook condition by actuating soft key C when basic display 110 is provided, and then actuating a desired one of keypad keys "2" through "9". Depending upon which keypad key is actuated, a sub-directory of names and associated telephone numbers is accessed and displayed. For example, if key "2" is actuated, the first name and associated telephone number beginning with the letter "A" is displayed. Each succeeding name beginning with the letter "A", and that individual's telephone number, are displayed upon each subsequent actuation of key "2". After scrolling through those names beginning with the letter "A", successive actuation of key "2" will result in a scrolling through the directory listing of those names beginning with the letter "B". Then, after the set of names beginning with the letter "B" has been exhausted, further actuation of the key "2" will result in the scrolling of names (and associated telephone numbers) beginning with the letter "C". In this manner, the entire set of stored names and telephone numbers may be displayed. A reverse scrolling effect may be carried out by actuating the BACK key included in keyboard 28. Similarly, names beginning with the letter "D" are read out and displayed, together with their associated telephone numbers, upon successive actuations of the key "3", and after all names beginning with the letter "D" have been exhausted, further actuation of this key results in the reading out and display of names beginning with the letter "E" together with the telephone numbers associated with those names. Thus, it is seen that, when terminal 10 is disposed in its on-hook mode, the actuation of directory soft key C together with a selected one of keys "2" through "9" serves to access and display names and associated telephone numbers, one name (and number) at a time.

If inquiry 348 is answered in the affirmative, that is, if the stored directory of names and telephone numbers is accessed in the manner discussed above, the accessed name and telephone number are displayed, as indicated at 350. Inquiry then is made at 352 to determine if the DIAL pushbutton is actuated. If this inquiry is answered in the negative, the accessed name and telephone number remain displayed, unless a different name and telephone number are accessed, as mentioned above.

However, if inquiry 352 is answered in the affirmative, that is, if the DIAL key is actuated when a telephone number is displayed, the displayed telephone number is dialed, as represented at 354. Furthermore, display 356 is provided, this display indicating the present time of day, the duration of the telephone call, and the name of the individual whose telephone number has been dialed. The microprocessor then advances to inquiry 286; and the routine carried out thereafter is executed in the same manner as discussed above.

If inquiry 348 is answered in the negative, that is, if terminal 10 remains in its on-hook condition, if the speakerphone mode is not selected, if the DICTATE pushbutton is not actuated, and if the stored telephone number directory is not accessed, the microprocessor routine advances to inquiry 358 to determine if any one of programmable keys 100 is actuated. If this inquiry is answered in the negative, the microprocessor returns to basic display 110. However, if a preprogrammed key 100 is actuated, inquiry 358 is answered in the affirmative and the programmed function that has been assigned to that key is carried out, as represented at 360. For example, a voice messaging function, a dial-out inhibit function, a telephone line selection function or a delayed ringing function, among others, is executed.

Returning to inquiry 272, let it be assumed that terminal 10 is disposed in its off-hook mode or, alternatively, speakerphone operation has been selected. Let it further be assumed that the programmable key assigned with the central dictation function is actuated. Inquiry 273 thus is answered in the affirmative. As mentioned above, microprocessor 70 responds to the actuation of this preprogrammed key to control central dictation interface 78, whereupon terminal 10 is connected via private wire network 92 to an available centrally disposed recorder. Inquiry 351 ascertains if a central recorder is available and, if so, that recorder is seized, as represented by instruction 353. A dictation operation now may be carried out by operating yoke 20 of handset 14. However, if a central recorder is not available, inquiry 351 is answered in the negative and basic display 110 is provided.

Assuming that a central recorder is seized for a central dictation operation, display 355 is provided. This display indicates the time of day and represents that terminal 10 is in communication with a central recorder. In addition, display 355 invites the user to advance the recording tape at the seized recorder in a fast forward mod by actuating soft key A, or to record an end-of-dictation signal by actuating soft key C. Also, an "ACCESSORY" function, known to those of ordinary skill in the central dictation art, may be selected by actuating soft key B.

Following display 355, the microprocessor advances to inquiry 357 to determine if handset 14 has returned to an on-hook condition. If this inquiry is answered in the negative, display 355 is retained and dictation may proceed via private wire network 92. However, if the terminal is disposed in its on-hook state, the seized recorder is released, as indicated at 359, and the microprocessor reverts to basic display 110. Thus, a dictate operation may proceed until terminal 10 reverts to its on-hook condition.

The foregoing has described the use of terminal 10 as a dictation terminal or as a telephone instrument. Dictation may be recorded on a local dictating machine, such as record/playback module 50, or on a central dictation system, as through central dictation interface 78 and private wire network 92, or onto a remotely disposed, telephone-accessed recorder. Also, terminal 10 may be used as a transcribe terminal. The previous discussion also has pointed out how various ones of programmable keys 100 may be assigned with desired operating functions, and those operating functions may be initiated simply by actuating a preprogrammed key. The use of terminal 10 to record incoming messages received via telephone lines also has been described; and the preceding discussion has pointed out how certain telephone-related functions of terminal 10 may be inhibited (e.g. dial-out inhibiting) or varied (e.g. delayed ringing, variable ringing tone, etc.). Reference manner in which a text message may be transmitted from a central station, such as supervisory console 96 (FIG. 4) via digital communication link 94 to terminal 10 for display on display 16. The length of the text message need be limited only by available digital memory included in terminal 10 or by the number of characters that may be displayed by display 16 (for example, two lines of sixteen characters each). For the purpose of description, it is assumed that text messages are generated by a supervisory operator located at supervisory console 96. However, any individual may generate a text message by the operation of a suitable keyboard, and that keyboard need not be limited solely to a supervisory console.

Figure 8:
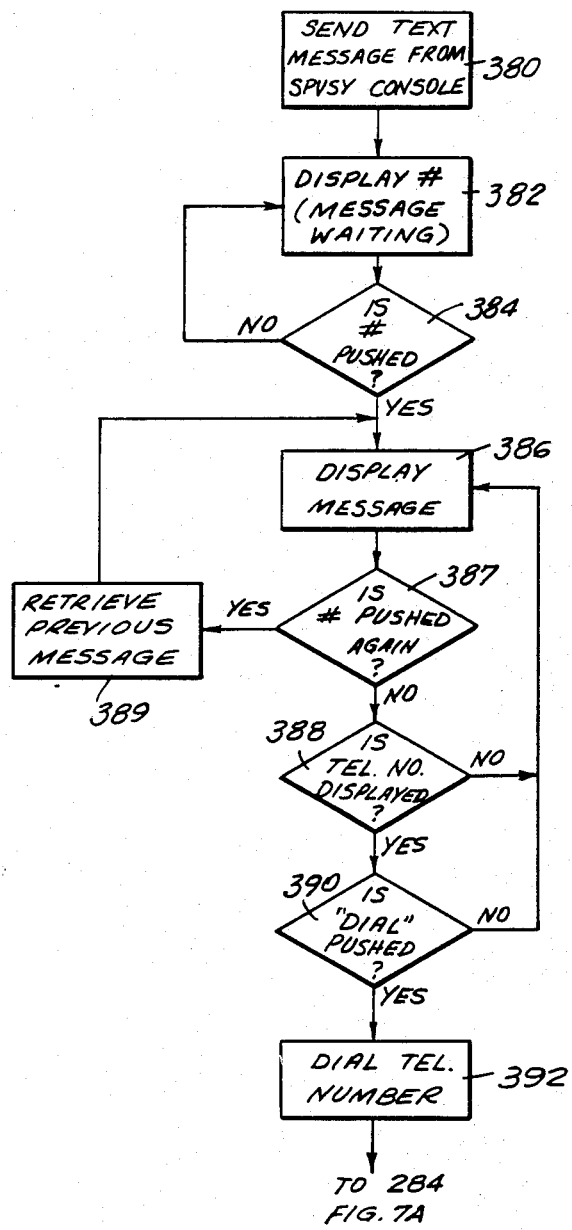
FIG. 8 shows a flow chart of the manner in which a text message is transmitted.

As shown in FIG. 8, the text message, which is recognized as being in digital form, is transmitted from the supervisory console to one or more terminals 10 via digital communication link 94. The text message may be in a format of the type conventionally used by, for example, typical microcomputers (also known as "personal computers"). The particular terminal (or terminals) to which the text message is directed may be identified by a suitable address; and the addressed terminal enables the text message to be received via digital network interface 80. The received message is stored in a suitable memory (not shown), and microprocessor 70, in response to the received text message, controls display 16 to display the character "#", as indicated at 382. It will be understood by users of the system in which such text messages may be communicated that this character means that a text message has been transmitted to the terminal from supervisory console 96. This character "#" may be displayed in addition to any other message then being displayed by display 16, examples of such messages having been discussed above.

After receipt of the text message, microprocessor 70 periodically inquires, at 384, if the key "#" included in keypad 24 has been actuated. If this inquiry is answered in the negative, the character "#" continues to be displayed. However, if the key "#" is actuated, the received and stored text message is displayed on display 16, as indicated by instruction 386. The routine then advances to inquiry 387 to determine if the key "#" is actuated again. If so, the previously received text message is read from storage and displayed, as represented by instruction 389. Thus, by successively actuating the key "#", the user may scroll through prior messages. If the key "#" is not pushed again, inquiry is made is at 388 to determine if a telephone number is displayed. If this inquiry is answered in the negative, the displayed message simply is retained. However, if a telephone number is displayed on display 16, inquiry is made, at 390, to determine if the DIAL key included on keypad 24 is actuated. If this inquiry is answered in the negative, the displayed message is retained, as represented at 386. However, if the DIAL key is actuated, the displayed telephone number is dialed automatically, as indicated at instruction 392, and the microprocessor advances to instruction 284 shown and discussed above in conjunction with FIG. 7. Thus, the telephone line is seized, the displayed telephone number is dialed and the duration of the telephone call is measured.

Depending upon the capacity of the memory at terminal 10, a plurality of text messages from supervisory console 96 may be received and stored. Each such message maybe displayed upon the actuation of the "#" key of keyboard 24, as mentioned above.

Although in the preferred embodiment text messages are transmitted by supervisory console 96, it is contemplated that, if desired, text messages may be transmitted from certain ones of terminals 10 to others of those terminals.

Figure 9:
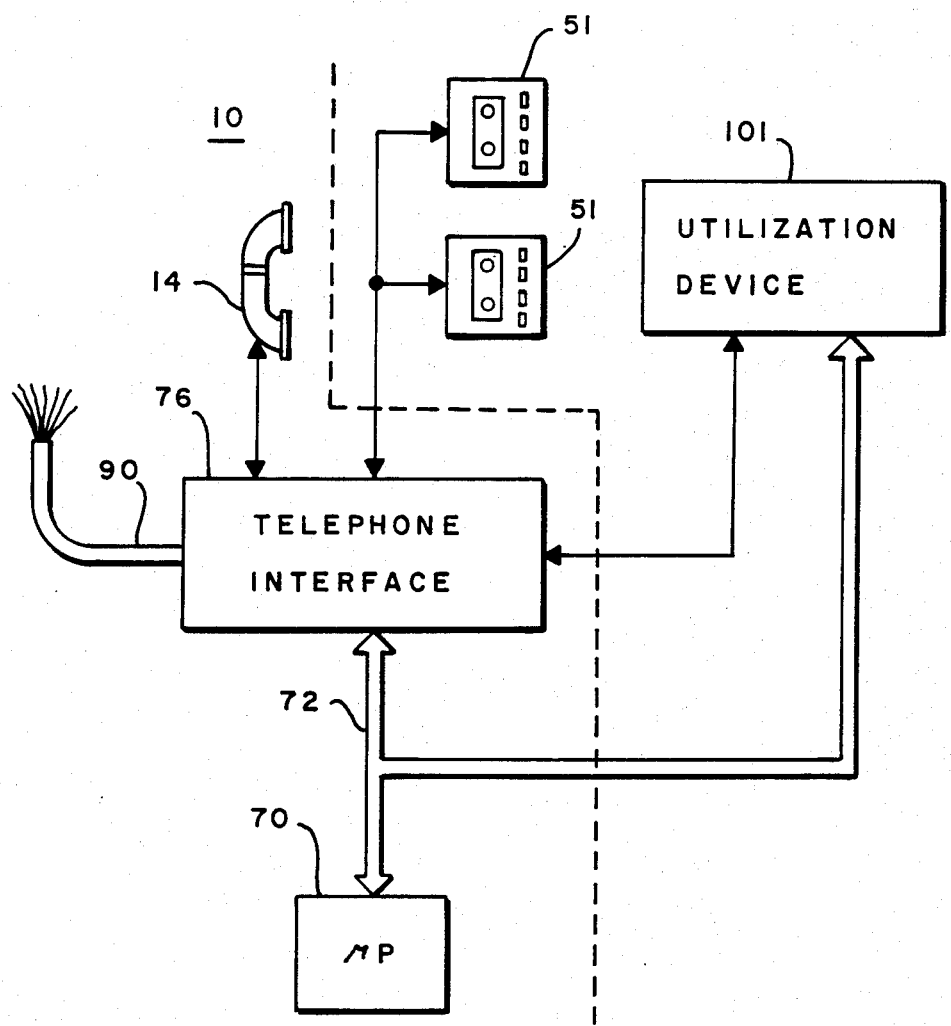
FIG. 9 is a block diagram representing further utilization of the present invention.

Turning now to FIG. 9, there is illustrated a block diagram of yet another use of the present invention. It will be seen that FIG. 9 includes a portion of the elements illustrated in FIG. 4, with the addition of a utilization device 101 coupled to terminal 10. Terminal 10 is the same dictation/telephone terminal described hereinabove; and, as will become apparent from the following description, a more accurate designation of terminal 10 is a communication terminal.

As before, terminal 10 includes microprocessor 70 coupled via bus 72 to telephone interface 76 which, in turn, is connected to handset 14 and one or both of record/playback modules 50 and 51. Telephone interface 76 is coupled to one or more telephone lines of telephone network 90 and, as has been described previously, the telephone interface functions to couple handset 14, record/playback module 50 or record/playback module 51 to the telephone network to permit communication between the coupled device and the telephone network. As now shown in FIG. 9, telephone interface 76 also is coupled to the utilization device 101. Furthermore, microprocessor 70 communicates with the utilization device via bus 72. Thus, the utilization device may be selectively connected to telephone network 90 for the communication of audio signals between that device and the telephone network, under the control of microprocessor 70. Stated otherwise, utilization device 101 is selectively connectable to telephone network 90 under the control of module 10.

The utilization device preferably is a device capable of transmitting and/or receiving information over a telephone line. In one embodiment, utilization device 101 comprises a facsimile machine which receives modulated audio signals transmitted over telephone network 90 from a remote location to reproduce a viewable image from those signals. The facsimile machine also functions to generate image signals in response to the scanning of a document and to send those image signals to a remote location via telephone interface 76 and telephone network 90. It will be appreciated that such image signals are modulated onto audio signals to facilitate the transmission thereof over the limited bandwidth of conventional telephone lines.

Other embodiments of utilization device 101 also may be used in place of a facsimile machine. For example, the utilization device may comprise a modem by which digital data is communicated between telephone network 90 and a digital operating device, such as a microcomputer, or the like, connected to that modem. As yet another embodiment, the utilization device may comprise a CRT display device operable to display viewable images derived from image signals transmitted thereto over telephone network 90. Such image signals may comprise suitably modulated video signals to permit information generated at a remote location to be displayed at the CRT. As an example, the CRT may comprise the display component of a "picturephone" device known to those of ordinary skill in the art.

Still another embodiment of utilization device 101 comprises a telephone-coupled printer. Such a printer is operable to receive digital print signals generated from a remote location and transmitted thereto via telephone network 90, and to convert those print signals into viewable images. Examples of telephone-coupled printers include dot-matrix printers, impact printers, ink-jet printers, laser printers, etc.

When used with utilization device 101, terminal 10 operates in the same manner as described in detail hereinabove. A desired one of programmable keys 100 may be programmed in a manner such that a utilization function is assigned thereto, such as by operating keypad 24 to enter a predetermined function code representative of the utilization device. Thereafter, when the assigned programmable key subsequently is actuated, the utilization device is selected for operation. For example, if the utilization device comprises a facsimile machine, actuation of the programmable key 100 which had previously been assigned with the utilization function serves to couple the facsimile machine to telephone network 90 via telephone interface 76. Under the control of microprocessor 70, the facsimile machine is energized to receive or transmit image signals. In the event that the receiving mode of the facsimile machine had been selected, image signals received from a remote location over telephone network 90 are demodulated and converted into viewable images by the facsimile machine. Conversely, if the transmit mode had been selected previously, actuation of the appropriate one of programmable keys 100 turns the facsimile device on and transmits image signals therefrom to a remote location via telephone network 90. Thus, a document may be reproduced or transmitted by the facsimile machine, depending upon the particular receiving or transmitting mode which had been selected.

As a simplification, utilization device 101 may be thought of as being similar to, for example, record/playback module 51 insofar as the record/playback module cooperates with terminal 10 for receiving/transmitting signals over telephone network 90. The utilization device may be modular in construction and may be connected to terminal 10 in a manner similar to record/playback module 50, shown in FIG. 3. An example of the manner in which a modular utilization device may be connected to terminal 10 and cooperable with that terminal to transmit and receive signals via telephone line is found in aforementioned copending application Ser. No. 895,006.

While the present invention has been particularly shown and described with reference to a preferred embodiment, it will be appreciated by those of ordinary skill in the art that various changes and modifications may be made without departing from the spirit and scope of the invention. For example, terminal 10 may be programmed to carry out all of the aforedescribed operating functions or, if desired, only selected ones of those functions as may be preferred by the user. Furthermore, although it is preferable that display 16 display messages in alignment with soft keys 40 such that responses to prompt messages may be entered merely by actuating the soft key in alignment with the desired response, such alignment is not necessary to carry out the present invention. It will be appreciated that the particular prompt messages that have been described herein are not intended to limit the present invention solely for use with those messages. Other messages controlled by microprocessor 70 may be displayed, and the response to those displayed messages may be effected by operating suitable keys or pushbuttons included in keypad 24, keyboard 28 or soft keys 40.

It is intended that the appended claims be interpreted to cover the foregoing as well as equivalents thereto.

What is claimed is:

1. A programmable telephone/dictation terminal disposable in respective modes of operation for use by a user to carry out different terminal operating functions including a dictation function and a telephone communication function, said terminal comprising:
   dialing means for producing dialing signals to dial a telephone number;
   dictation means operable to initiate predetermined dictate functions;
   programmble function keys each being programmably assigned by the user with a particular terminal operating function and each being manually operable to select its assigned operating function; and
   processor means having a programming mode for assigning respective ones of the programmable function keys with particular operating functions, and exhibiting an operating mode responsive to the operation of a programmable function key for disposing the terminal in a respective mode of operation to carry out the function selected by the operated function key;
   display means controlled by said processor means for displaying predetermined messages representing the selected mode of operation in which said terminal is disposed, the displayed message being changed as the mode of operation changes; and,
   means for establishing an off-hook condition for said terminal to carry out a telephone communication function or a dictation function; and wherein said processor means responds to an off-hook condition to control said display means to display a predetermined message and responds to a programmable function key or to said dictation means for disposing said terminal in a selected mode of operation.

2. The invention of claim 1 wherein said processor means is responsive to said dialing means to dial a corresponding telephone number.

3. The invention of claim 1 wherein said dialing means includes automatic dialing means comprising plural keys each operable to select a previously determined telephone number.

4. The invention of claim 2 wherein said processor means is responsive to said dictation means following the dialing of a telephone number to command a corresponding dictate function to be carried out at a location represented by the dialed telephone number.

5. A programmable telephone/dictation terminal disposable in respective modes of operation for use with a local dictating machine connected thereto and a telephone network having a plural telephone lines, said terminal comprising:
   microphone and speaker means for transmitting and receiving audible sounds;
   means for dialing telephone numbers;
   dictate function switches manually operable to initiate predetermined dictate functions;
   programmable keys each being manually operable to carry out a function programmed for that key, said functions including telephone message recording for recording on at least said local dictating machine messages received over at least one of said telephone lines;
   control keys operable to select programmed functions to be carried out by said programmable keys;
   processor means having a programming mode for responding to operation of said control keys to select respective telephone lines over which messages to be recorded are received and to select the manner in which a message is recorded; said processor means being responsive to a predetermined programmable key to exhibit an operating mode for controlling the recording of a message received over a selected telephone line; and
   display means controlled by said processor means to display different messages as said control keys and said programmable keys are operated to prompt a user of said terminal in selecting a telephone line and the manner in which a message is to be recorded.

6. The invention of claim 5 wherein said processor means responds to operation of a predetermined control key to enter into said programming mode and to control said display means to display a prompt message representing plural modes of telephone message recording, said prompt message inviting the selection of one of said recording modes.

7. The invention of claim 6 wherein said prompt message includes the representation of remote dictation message recording; and wherein said processor means is responsive to the operation of a control key indicating the selection of remote dictation message recording to control said display means to display a prompt message inviting the selection of a telephone line over which an incoming message is to be recorded on said local dictating machine.

8. The invention of claim 7 further comprising selecting means for selection by a user of the telephone line over which an incoming message is to be recorded on said local dictating machine; and wherein said processor means responds to the operation of said predetermined programmable key to enter into said operating mode and sense an incoming telephone call on said selected telephone line for initiating the recording on said local dictating machine of a message received on said selected telephone line.

9. The invention of claim 8 wherein said processor means responds to each incoming telephone call on said selected telephone line for controlling said display means to display the sequential number of said telephone call, the time of day of said telephone call and the duration of said recorded message.

10. The invention of claim 6 wherein said prompt message includes the representation of telephone answering message recording; and wherein said processor means is responsive to the operation of a control key indicating the selection of telephone answering message recording to control said display means to display a prompt message inviting the selection of a telephone line over which an incoming message is recorded on said local dictating machine.

11. The invention of claim 10 further comprising selecting means for selecting the telephone line over which an incoming message is to be recorded; and wherein said processor means controls said display means to display a prompt message inviting selected recording or receiving of an announcement message to be played back in response to a telephone call received on the selected telephone line.

12. The invention of claim 11 wherein said processor means responds to the operation of said predetermined programmable key to enter into said operating mode and sense an incoming telephone call on said selected telephone line for initiating the playing back of said announcement message and the recording of a message received on said selected telephone line.

13. The invention of claim 12 wherein said announcement message is recorded on and played back from the same local dictating machine that records said received message.

14. The invention of claim 12 further comprising an additional dictating machine on which said announcement message is recorded, and wherein said processor means, when in said operating mode, senses an incoming telephone call on said selected telephone line for initiating the playing back of said announcement message from said additional dictating machine and, thereafter, the recording of said received message on the first-mentioned dictating machine.

15. The invention of claim 12 wherein said processor means responds to said recorded received message to display the sequential number of said received message, the time of day of said received message and the duration of said received message.

16. The invention of claim 6 wherein said prompt message includes the representation of automatic message recording; and wherein said processor means is responsive to the operation of a control key indicating the selection of automatic message recording to control said display means to display a prompt message inviting the selection of a telephone line over which an incoming message is recorded on said local dictating machine.

17. The invention of claim 16 further comprising selecting means for selecting the telephone line over which an incoming message is to be recorded; and wherein said processor means responds to the operation of said predetermined programmable key to enter into said operating mode and enable the recording of a message received on said selected telephone line.

18. The invention of claim 17 further comprising start means manually operable to turn on said local dictating machine for recording said incoming message received on said selected telephone line.

19. A programmable telephone/dictation terminal disposable in respective modes of operation to carry out a dictation function, and to carry out a telephone communication function for initiating and receiving telephone calls over a telephone network, said terminal comprising:
 microphone and speaker means for transmitting and receiving audible sounds;
 keypad means operable to dial telephone numbers;
 settable automatic dialing keys operable to dial respective preset telephone numbers;
 dictate switches manually operable to initiate predetermined dictate functions;
 programmable keys each being manually operable to carry out a function programmed for that key, said function including telephone number dialing capability of said terminal;
 control keys operable to select programmed functions to be carried out by said programmable keys;
 processing means having a programming mode for responding to operation of said control keys to selectively limit telephone numbers that may be dialed; and
 display means controlled by said processor means to display different messages as said control keys are operated to prompt a user of said terminal in limiting the telephone numbers that may be dialed.

20. The invention of claim 19 wherein said processor means responds to a predetermined control key to enter into said programming mode and to control said display means to display a prompt message inviting selection by an operator of a telephone number dialing limitation function.

21. The invention of claim 20 wherein said processor means is conditioned by the operation of a control key indicating the selection of said telephone number dialing limitation function to respond to the operation of said keypad means representing a number of telephone number digits that can be dialed from said keypad means for establishing said number of digits as a limitation on the telephone number dialing capability of said terminal.

22. The invention of claim 21 wherein said processor means responds to said operation of said control key to control said display means to display a prompt message inviting the operation of said keypad means; and said processor means responds to the operation of said keypad means to control said display means to display said number of digits.

23. The invention of claim 22 wherein said processor means responds to the operation of a predetermined programmable key to enter into an operating mode thereby to inhibit the dialing of a telephone number comprised of more than said established number of digits.

24. The invention of claim 20 wherein said processor means is conditioned by operation of a control key indicating selection of said telephone number dialing limitation function to control said display means to display a prompt message inviting the selected enabling or inhibiting of telephone number dialing by the operation of said settable automatic dialing keys.

25. The invention of claim 24 further comprising selecting means for enabling of inhibiting telephone number dialing by said settable automatic dialing keys; and said processor means responds to the operation of a predetermined programmable key to enter into an operating mode thereby to enable or inhibit telephone number dialing by said settable automatic dialing keys.

26. The invention of claim 19, further comprising ringing sound generating means for generating audible ringing sounds in response to ringing signals representing a received telephone call; wherein the functions carried out by said programmable keys further include delaying the generation of an audible ringing sound until after a selectable number of ringing signals has been received; and wherein said processor means responds to the operation of said control keys to select the number of ringing signals by which said generation of an audible ringing sound is delayed.

27. The invention of claim 26 wherein said processor means responds to a predetermined control key to enter into said programming mode and to control said display means to display a prompt message inviting the selection by an operator of the number of ringing signals by which said generation of an audible ringing sound is delayed.

28. The invention of claim 27, further comprising means for selecting said number of ringing signals, said processor means responding to operation of a particular programmable key to enter into an operating mode whereby to delay the generation of an audible ringing sound until after said selected number of ringing signals has been received.

29. The invention of claim 19 wherein said terminal is connectable to a dictating machine; wherein the functions carried out by said programmable keys further include recording on said dictating machine a message received from said telephone network; wherein said terminal receives ringing signals representing an incoming telephone call; wherein said processor means is responsive to the operation of said control keys to select the number of ringing signals which must be received before the received message is recorded; and wherein the processor means responds to a particular programmable key to exhibit an operating mode in which said dictating machine is activated after the selected number of ringing signals have been received.

30. The invention of claim 29 wherein said processor means responds to a predetermined control key to enter into said programming mode and to control said display means to display a prompt message inviting the selection by an operator of the number of ringing signals which must be received before said dictating machine is activated.

31. A telephone/dictation system disposable in different modes of operation for dictation and for telephone communication, the system comprising:
a supervisory station including means for generating a message;
at least one remote station coupled to said supervisory station and including dictate means for dictation by a user of information for recording and telephone means for initiating and receiving telephone calls, said remote station further including:
display means for displaying in alphanumeric form a message generated at said supervisory station.

32. The system of claim 31 further including means for transmitting said message to said one remote station, and wherein said remote station additionally includes means for indicating the receipt of said message, and manually operable means for causing said display means to display said message.

33. The system of claim 32 wherein said remote terminal further includes dialing means for dialing a telephone number, and manually operable dial initiating means for dialing a telephone number displayed on said display means.

34. The system of claim 33 wherein the received message includes a telephone number.

35. A telephone/dictation system disposable in different modes of operation for dictation and for telephone communication, the system comprising:
a supervisory station including display means for displaying messages;
plural remote stations each coupled to said supervisory station and each including:
dictate means for dictation by a user of information for recording;
telephone means for initiating and receiving telephone calls;
programmable keys for selecting different operating functions to be carried out by the remote station, each key being programmable to select a desired one of plural predetermined functions;
processor means for changeably assigning respective functions to said programmable keys; and
a selected one of the programmable keys in each of said remote stations being operable to transmit to said supervisory station information to cause a predetermined message to be displayed on said display means.

36. A method of assigning a desired one of predetermined operating functions to one of plural programmable keys provided in a telephone/dictation terminal such that the operation of that programmable key results in the selection of an operating function carried out by the terminal, said method comprising the steps of:
displaying sets of operating functions that may be carried out by the terminal;
selecting one of the displayed sets;
selecting a desired programmable key; and
entering an identification of a desired operating function, whereby the subsequent operation of the selected programmable key initiates said desired operating function;
wherein said terminal is coupled to a supervisory station, and said desired operating function is the transmission of a predetermined message to said supervisory station.

37. The method of claim 36 wherein the subsequent operation of said selected programmable key transmits to said supervisory station signals representing said predetermined message for alphanumeric display at said supervisory station.

38. A method of assigning a desired one of predetermined operating functions to one of plural programmable keys provided in a telephone/dictation terminal such that the operation of that programmable key results in the selection of an operating function carried out by the terminal, said method comprising the steps of:
displaying sets of operating functions that may be carried out by the terminal;
selecting one of the displayed sets;
selecting a desired programmable key; and
entering an identification of a desired operating function, whereby the subsequent operation of the selected programmable key initiates said desired operating function;

wherein said terminal is operable with a telephone network to transmit and receive telephone calls and said terminal includes a recorder for recording and playing back audio messages; and, wherein said desired operating function is recording on said recorder of audio messages received from said telephone network.

39. The method of claim 38 wherein the subsequent operation of said selected programmable key conditions said terminal to detect an incoming telephone call, turn on said recorder and record a received audio message.

40. The method of claim 39 further comprising the step of displaying an indication of the receipt and recording of an audio message.

41. The method of claim 40 further comprising the steps of storing message data associated with each recorded message, said message data including an identity, length and time of recording for said each recorded message; displaying the message data associated with the last message that was recorded; and scrolling through said stored message data.

42. The method of claim 41 further comprising the steps of selecting for playback a message associated with displayed message data, and playing back the selected message.

43. The method of claim 39 wherein said terminal includes a playback device for playing back a prerecorded announcement message; and wherein said subsequent operation of said selected programmable key conditions said terminal to turn on said playback device in response to the detection of an incoming call.

44. The method of claim 39 wherein said telephone network includes plural telephone lines; and further comprising the steps of displaying the telephone line to which said recorder is coupled to record an audio message received over that telephone line, and changing the selection of a telephone line coupled to said recorder.

45. The method of claim 44 wherein said terminal includes a second recorder; and further comprising the steps of displaying the telephone lines to which the respective recorders are coupled, and changing the selection of those telephone lines.

46. The method of claim 45 wherein said subsequent operation of said selected programmable key conditions said terminal to detect an incoming telephone call on any of the telephone lines selected for coupling to any of the recorders, turn on the recorder that is coupled to the telephone line on which an incoming telephone call is detected, and record a received audio message.

47. A method of assigning a desired one of predetermined operating functions to one of plural programmable keys provided in a telephone/dictation terminal such that the operation of that programmable key results in the selection of an operating function carried out by the terminal, said method comprising the steps of:
displaying sets of operating functions that may be carried out by the terminal;
selecting one of the displayed sets;
selecting a desired programmable key; and
entering an identification of a desired operating function, whereby the subsequent operation of the selected programmable key initiates said desired operating function;
wherein said terminal is operable with a telephone network having at least one telephone line, said terminal generating an audible ringing signal in response to an incoming ringing signal; and,
wherein said desired operating function is the delay in generating said audible ringing signal until after a selected number of incoming ringing signals have been received.

48. The method of claim 47 further comprising the steps of selecting a respective telephone line, and selecting the number of incoming ringing signals by which the audible ringing signal is delayed for an incoming telephone call on that telephone line.

49. The method of claim 48 wherein subsequent operation of said selected programmable key conditions said terminal to delay the generation of an audible ringing signal on a selected telephone line until after said selected number of incoming ringing signals have been detected.

50. The method of claim 49 additionally comprising the step of selectively changing a predetermined identifying code.

51. A telephone/dictation system disposable in different modes of operation for dictation functions and for recording incoming messages received over a telephone network having plural telephone lines, said system comprising:
a recorder for recording messages;
line selector means for selection by a user of a particular one of said plural telephone lines to be coupled to said recorder for supplying an incoming message received on said particular telephone line;
processor means for sensing an incoming telephone call on said particular telephone line to initiate a recording operation of said recorder;
function selector means manually operable to condition said processor means for sensing incoming telephone calls; and
means coupled to said processor means for selectively carrying out dictation functions with said recorder;
a second recorder wherein said line selector means is operable to select another one of said telephone lines to be coupled to said second recorder to supply thereto an incoming message received on said other telephone line; and wherein said processor means is operable to sense an incoming telephone call on said other telephone line to initiate a recording operation of said second recorder, wherein said function selector means comprises a selected one of plural programmable keys, each being programmable to condition said processor means to carry out a different one of plural predetermined functions;
control keys operable to select respective functions to be carried out, said functions being assignable by a user to desired ones of said programmable keys; and
display means controlled by said processor means, said processor means responding to the operation of respective control keys to cause said display means to display different ones of said predetermined functions and to display the respective telephone line selected for coupling to the respective recorders, said processor means additionally responding to the operation of a desired programmable key to assign a selected function thereto.

52. A telephone/dictation system disposable in different modes of operation for dictation functions and for recording incoming messages received over a telephone network having plural telephone lines, said system comprising:
a recorder for recording messages;

line selector means for selection by a user of a particular one of said plural telephone lines to be coupled to said recorder for supplying an incoming message received on said particular telephone line;

processor means for sensing an incoming telephone call on said particular telephone line to initiate a recording operation of said recorder;

function selector means manually operable to condition said processor means for sensing incoming telephone calls; and means coupled to said processor means for selectively carrying out dictation functions with said recorder;

display means controlled by said processor means to display indications that incoming messages have been recorded; and message selector means manually operable by a user to select a recorded message to be played back in accordance with said displayed indications; said processor means responding to the operation of said message selector means to play back a selected message corresponding to one of said displayed indications from said recorder.

* * * * *